US012247266B2

(12) United States Patent
Ren et al.

(10) Patent No.: US 12,247,266 B2
(45) Date of Patent: Mar. 11, 2025

(54) EXTRACTION OF BASE METALS USING CARBONACEOUS MATTER AND A THIOCARBONYL FUNCTIONAL GROUP REAGENT

(71) Applicant: Jetti Resources, LLC, Boulder, CO (US)

(72) Inventors: Zihe Ren, Richmond (CA); Nelson Mora Huertas, Boulder, CO (US); David Dixon, Delta (CA); Edouard Asselin, Richmond (CA)

(73) Assignee: Jetti Resources, LLC, Boulder, CO (US)

( * ) Notice: Subject to any disclaimer, the term of this patent is extended or adjusted under 35 U.S.C. 154(b) by 0 days.

(21) Appl. No.: 18/027,088

(22) PCT Filed: Sep. 10, 2021

(86) PCT No.: PCT/CA2021/051261
§ 371 (c)(1),
(2) Date: Mar. 17, 2023

(87) PCT Pub. No.: WO2022/056621
PCT Pub. Date: Mar. 24, 2022

(65) Prior Publication Data
US 2023/0257852 A1    Aug. 17, 2023

(51) Int. Cl.
*C25C 1/00* (2006.01)
*C22B 3/08* (2006.01)
*C22B 3/26* (2006.01)
*C22B 15/00* (2006.01)
*C25C 1/12* (2006.01)

(52) U.S. Cl.
CPC ............ *C22B 15/0089* (2013.01); *C22B 3/08* (2013.01); *C22B 3/26* (2021.05); *C22B 15/0071* (2013.01); *C25C 1/12* (2013.01)

(58) Field of Classification Search
CPC ......... C25B 15/0089; C22B 3/26; C22B 3/08; C22B 15/0071; C25C 1/12
See application file for complete search history.

(56) References Cited
U.S. PATENT DOCUMENTS

| | | |
|---|---|---|
| 2,716,600 A | 8/1955 | Frick et al. |
| 2,902,345 A | 9/1959 | Hyde et al. |
| 3,679,397 A | 7/1972 | Oconnor et al. |
| 3,761,566 A | 9/1973 | Michal |
| 3,884,831 A | 5/1975 | Bloom |
| 4,082,833 A | 4/1978 | Wyndham et al. |
| 4,556,483 A | 12/1985 | Fu et al. |
| 4,561,947 A | 12/1985 | Schulze |
| 4,778,519 A * | 10/1988 | Pesic ............ C01G 5/003 423/43 |
| 4,913,730 A | 4/1990 | Deschenes et al. |
| 5,104,445 A | 4/1992 | Dubrovsky et al. |
| 5,260,040 A | 11/1993 | Kenna |
| 5,795,465 A | 8/1998 | Arbiter |
| 5,989,311 A | 11/1999 | Han et al. |
| 6,146,444 A | 11/2000 | Kohr |
| 6,746,512 B1 | 6/2004 | Shaw |
| 7,722,840 B2 | 5/2010 | Hackl et al. |
| 7,964,015 B2 | 6/2011 | Creasey et al. |
| 8,163,063 B2 | 4/2012 | Manabe |
| 8,287,623 B2 | 10/2012 | Manabe |
| 8,435,793 B2 | 5/2013 | Nomura et al. |
| 8,865,119 B2 | 10/2014 | Kuwano et al. |
| 9,068,242 B2 | 6/2015 | Ishida et al. |
| 9,290,827 B2 | 3/2016 | Hatano et al. |
| 10,344,353 B2 | 7/2019 | Mujicic et al. |
| 10,745,778 B2 | 8/2020 | Bender et al. |
| 10,781,502 B2 | 9/2020 | Dixon et al. |
| 10,865,460 B2 | 12/2020 | Dixon et al. |
| 10,870,903 B2 | 12/2020 | Dixon et al. |
| 10,876,186 B2 | 12/2020 | Dixon et al. |
| 10,876,187 B2 | 12/2020 | Dixon et al. |
| 10,954,583 B2 | 3/2021 | Dixon et al. |
| 10,961,604 B2 | 3/2021 | Dixon et al. |
| 11,111,559 B2 | 9/2021 | Palmer et al. |
| 11,859,263 B2 | 1/2024 | Dixon et al. |
| 2004/0197249 A1 | 10/2004 | Wan et al. |
| 2005/0269208 A1 | 12/2005 | Dixon et al. |

(Continued)

FOREIGN PATENT DOCUMENTS

| | | |
|---|---|---|
| AP | 5183 | 7/2020 |
| AR | 104304 A1 | 7/2017 |

(Continued)

OTHER PUBLICATIONS

Sequeira, C. A.C., et al., "Chemical metathesis of chalcopyrite in acidic solutions", Hydrometallurgy, vol. 92, No. 3, 2008, 135-140.
Torma , et al., "Effects of Surface Active Agents on the Oxidation of Chalcopyrite by Thiobacillus Ferrooxidans", Hydrometallurgy, vol. 1, 1976, 301-309.
Ubaldini , et al., "An innovative thiourea gold leaching process", Hydrometallurgy, vol. 48, 1998, 113-124.
Umland , et al., "Complex Compounds in Analytical Chemistry", Moscow, 1975, 69-72.
Umland , et al., "Coordination compounds in analytical chemistry. Theory and practice", Mir, Moscow, 1975, 127-128.
Vedejx , et al., "2,2-Dimethlypropanethial: A Long-Lived Aliphatic Thioaldehyde", J. Am. Chem. Soc., 1983, 1683-1684.

(Continued)

*Primary Examiner* — Zulmariam Mendez
(74) *Attorney, Agent, or Firm* — Peacock Law P.C.; Deborah A. Peacock; Marco H. Santamaria

(57) ABSTRACT

The present disclosure relates to the use of carbonaceous matter and a reagent comprising a thiocarbonyl functional group, for example, in a method for extracting a base metal such as copper from a material comprising the base metal. Such methods can comprise contacting the material under acidic conditions with the carbonaceous matter and the reagent comprising the thiocarbonyl functional group; and optionally recovering the base metal.

29 Claims, 3 Drawing Sheets

(56) References Cited

U.S. PATENT DOCUMENTS

| | | |
|---|---|---|
| 2006/0193762 A1 | 8/2006 | Misra et al. |
| 2008/0026450 A1 | 1/2008 | Ohtsuka et al. |
| 2008/0286180 A1 | 11/2008 | Jones |
| 2010/0018349 A1 | 1/2010 | Manabe |
| 2010/0021370 A1 | 1/2010 | Nagaraj et al. |
| 2011/0290657 A1 | 12/2011 | Lapidus Lavine et al. |
| 2012/0251417 A1 | 10/2012 | Shimomura et al. |
| 2013/0140186 A1 | 6/2013 | Lapidus et al. |
| 2013/0333524 A1 | 12/2013 | Aghemio Rodriguez |
| 2014/0212346 A1 | 7/2014 | Xia |
| 2016/0145714 A1 | 5/2016 | Liddell et al. |
| 2016/0298209 A1 | 10/2016 | Mujicic et al. |
| 2017/0159153 A1 | 6/2017 | Bender et al. |
| 2017/0335428 A1 | 11/2017 | Gutiérrez et al. |
| 2018/0135148 A1 | 5/2018 | Dixon et al. |
| 2018/0223392 A1 | 8/2018 | Wyrsta |
| 2020/0048736 A1 | 2/2020 | Dixon et al. |
| 2020/0181735 A1 | 6/2020 | Dixon et al. |
| 2020/0181736 A1 | 6/2020 | Dixon et al. |
| 2020/0181737 A1 | 6/2020 | Dixon et al. |
| 2021/0198767 A1 | 7/2021 | Dixon et al. |
| 2021/0376400 A1* | 12/2021 | Bhave ................... C22B 26/12 |
| 2023/0227936 A1 | 7/2023 | Ren et al. |
| 2024/0141456 A1 | 5/2024 | Dixon et al. |
| 2024/0167121 A1 | 5/2024 | Dixon et al. |
| 2024/0254590 A1 | 8/2024 | Ren et al. |

FOREIGN PATENT DOCUMENTS

| | | |
|---|---|---|
| AR | 109843 A1 | 1/2019 |
| AR | 123458 A2 | 12/2022 |
| AR | 123459 A2 | 12/2022 |
| AR | 123462 A2 | 12/2022 |
| AU | 2016250309 B2 | 2/2019 |
| AU | 2018247307 C1 | 5/2020 |
| AU | 2020200918 B2 | 12/2021 |
| AU | 2022218559 A1 | 9/2022 |
| AU | 2022218577 A1 | 9/2022 |
| AU | 2021204246 B2 | 10/2022 |
| AU | 2017346972 B2 | 1/2023 |
| AU | 2022218579 B2 | 4/2023 |
| AU | 2021343571 A1 | 5/2023 |
| AU | 2021345381 A1 | 5/2023 |
| BR | 112017020592 A2 | 7/2018 |
| BR | 112019008080 A2 | 7/2019 |
| BR | 112017022091 B1 | 8/2021 |
| CA | 2023119 | 2/1991 |
| CA | 2597937 C | 4/2013 |
| CA | 2976958 | 9/2016 |
| CA | 2973612 A1 | 10/2016 |
| CA | 3032992 A1 | 4/2018 |
| CA | 3052576 A1 | 4/2018 |
| CA | 3052572 C | 8/2020 |
| CA | 3127820 C | 3/2022 |
| CA | 3130427 A1 | 3/2022 |
| CA | 3130430 A1 | 3/2022 |
| CL | 2004000703 A1 | 3/2005 |
| CL | 2007002165 A1 | 2/2008 |
| CL | 2008001423 A1 | 8/2008 |
| CL | 2009000554 A1 | 7/2009 |
| CL | 2016001188 A1 | 2/2017 |
| CL | 2017002632 A1 | 3/2018 |
| CL | 2019002080 A1 | 10/2019 |
| CL | 2020000013 A1 | 6/2020 |
| CL | 2021002245 A1 | 3/2022 |
| CL | 2021002246 A1 | 3/2022 |
| CL | 2021002247 A1 | 3/2022 |
| CL | 202300769 | 9/2023 |
| CL | 202300770 | 9/2023 |
| CN | 1081471 | 2/1994 |
| CN | 101033508 A | 9/2007 |
| CN | 101818258 A | 9/2010 |
| CN | 103789546 A | 5/2014 |
| CN | 103993171 A | 8/2014 |
| CN | 107532229 A | 1/2018 |
| CN | 110860277 A | 3/2020 |
| CN | 111850294 A | 10/2020 |
| CN | 110352256 B | 1/2023 |
| EA | 201792285 A1 | 2/2018 |
| EC | 1768938 | 4/2018 |
| EP | 0522978 A1 | 1/1993 |
| EP | 0536914 A1 | 4/1993 |
| EP | 3283661 A1 | 2/2018 |
| EP | 4214343 A1 | 7/2023 |
| GB | 1528061 A | 10/1978 |
| GB | 2180829 | 4/1987 |
| GB | 2349876 | 11/2000 |
| JP | 9-13127 | 1/1997 |
| JP | 11-506808 | 6/1999 |
| JP | 2010180450 A | 8/2010 |
| JP | 2011161386 A | 8/2011 |
| JP | 2018513279 A | 5/2018 |
| JP | 2019039076 A | 3/2019 |
| JP | 2020522606 A | 7/2020 |
| JP | 2020153018 A | 9/2020 |
| JP | 2022001668 A | 1/2022 |
| MN | 100004745 | 7/2019 |
| MN | 10-0005216 | 2/2022 |
| MX | 2008003249 | 9/2009 |
| MX | 2017013312 A | 9/2018 |
| MX | 2019004592 A | 10/2019 |
| MX | 2020006857 A | 8/2020 |
| PE | 2020-0914 | 9/2020 |
| PE | 10509 | 2/2021 |
| PE | 20230857 A1 | 5/2023 |
| PE | 2024-0715 | 4/2024 |
| PE | 20240830 | 4/2024 |
| PE | 20240831 | 4/2024 |
| PE | 20240832 | 4/2024 |
| PH | 12017501886 A1 | 3/2018 |
| SU | 1636463 | 3/1991 |
| WO | 9808585 | 3/1998 |
| WO | 9814623 A1 | 4/1998 |
| WO | 03080879 A1 | 10/2003 |
| WO | 2004029306 | 4/2004 |
| WO | 2006070052 A1 | 7/2006 |
| WO | 2007042604 | 4/2007 |
| WO | 2010037169 A1 | 4/2010 |
| WO | 2012081953 A1 | 6/2012 |
| WO | 2014150710 A1 | 9/2014 |
| WO | 2015059551 | 4/2015 |
| WO | 2016141438 | 9/2016 |
| WO | 2016165027 | 10/2016 |
| WO | 2018072029 A1 | 4/2018 |
| WO | 2020071763 A1 | 4/2020 |
| WO | 2022056621 A1 | 3/2022 |
| WO | 2022056622 A1 | 3/2022 |

OTHER PUBLICATIONS

Velasquez-Yevenes, L., et al., "The dissolution of chalcopyrite in chloride solutions: Part 1. The effect of solution potential", Hydrometallurgy, vol. 103, No. 1, 2010, 108-113.

Wang, et al., "Mineralogy and Pretreatment of a Refractory Gold Deposit in Zambia", Minerals, vol. 9, No. 406, 2019, 1-16.

Watling, H. R., "Chalcopyrite hydrometallurgy at atmospheric pressure: 2. Review of acidic chloride process options", Hydrometallurgy, vol. 146, 2014, 96-110.

Whitehead, J. A., et al., "Application of 1-alkul-3-methyl-imidazolium ionic liquids in the oxidative leaching of suphidic copper, gold and silver ores", Hydrometallurgy, vol. 88, Elsevier B.V., 2007, 109-120.

Wilson, J. P., et al., "Cuprice Chloride Leaching of Chalcopyrite", JOM, vol. 33, No. 2, 1981, 52-57.

Winand, Rene, "Chloride Hydrometallurgy", Hydrometallurgy, vol. 26, No. 2, 12/1001, 285-316.

Xing, et al., "A Review on the Recovery of Noble Metals from Anode Slimes", Mineral Processing and Extractive Metallurgy Review, 2019, 1-14.

Yanez, et al., "Heap Leaching Improvements Using a New Leaching Aid Reagent", 11th International Seminar on Process Hydrometallurgy, Jun. 19, 2019-Jun. 21, 2019, Santiago Chile, 2019.

(56) References Cited

OTHER PUBLICATIONS

Yang, et al., "A Copper and Iron K-edige XANES Study on Chalcopyrite Leached by Mesophiles and Moderate Thermophiles", Minerals Engineering, vol. 48, 2013, 31-35.
Yang, Xiyun, et al., "The interaction of thiourea and formamidine disulfide in the dissoluation of gold in sulfuric acid solutsion", Minerals Engineering, vol. 23, 2010, 698-704.
Zhang, et al., "Catalytic Effect of Polyethylene Glycol on Sulfur Oxidation in Chalcopyrite Bioleaching by Acidithiobacillus Ferrooxidans", Minerals Engineering, vol. 95, 2016, 74-76.
Zhang, et al., "Effects of Triton X-100 on Oxidative Activity of Acidthiobacillus Ferrooxidans and on Chalcopyrite Bioleaching", Journal of Northeaster University (Natural Science), vol. 37, No. 6, 2016, 861-864.
Zhang, et al., "Enhancing the Leaching of cChalcopyrite Using Acidithiobacillus ferrooxidans under the Induction of Surfactant Triton X-100", Minerals, vol. 1, No. 11, 2019, 1-15.
Zhu, Tun, "The redox reaction between thiourea and ferric iron and catalysis of sulphide ores", Hydrometallurgy, vol. 28, No. 3, Apr. 1992, 381-397.
Rebolledo, Monserrat, "Kinetic Study of the Dissolution of Chalcopyrite in the Presence of a Catalyst Under Acidic Sulfate Medium", University of British Columbia. Retrieved from https://open.library.ubc.ca/collections/ubctheses/24/items/1.0349087, Jul. 31, 2017, 129 pages.
Li, Xiaohua, et al., "Solvometallurgical process for extraction of copper from chalcopyrite and other sulfidic ore minerals", Green Chemistry, vol. 22, issue 2, 10.1039/C9GC02983D., 2020, 417-426.
Solis-Marcial, O.J., et al., "Chalcopyrite leaching in alcoholic acid media", vols. 147-148, DOI: 10.1016/j.hydromet., Apr. 11, 2014.
Tehrani, Mohammad Ebrahim Haji Naghi, et al., "Electrochemical Study and XPS Analysis of Chalcopyrite Dissolution in Sulfuric Acid in the Presence of Ethylene Glycol", Electrochimica Acta, 2021, vol. 369, article No. 137663, 10 pp: DOI:10.1016/j.electacta.2020.137663, 2021, 1-10.
"Castromil Portugal", www.medgoldresources.com (projects.gtk.fi/export/sites/projects/susmin/about/Castromil_cas_study.pdf), Jan. 13, 2015.
"Thioaldehydes", Wikipedia, accessed online Oct. 16, 2020, https://ru/wikipedia.org/wili/thioaldehydes.
"Thiodetones", Wikipedia, accessed online Oct. 16, 2020, https://ru/wikipedia.org/wiki/thioketones.
Akretche, Djamal-Eddine, et al., "Selective leaching of a polymettalic complex ore by sulphuric acid and thiourea mixed with sea water", Hydrometallurgy vol. 38, 1995, 189-204.
Ando, et al., "The First Stable Enethiolizable Thioaldehyde via a Zirconocene q2-Thioacyl Complex", J. Am. Chem. Soc, vol. 113, 1991, 7782-7784.
Armstrong, S. K., et al., "Cross-referenced combinatorial libraries for the discovery of metal-complexing ligans: library deconvolution by LC-MS", Analyst, vol. 125, No. 12, 2000, 2206-2215.
Bombicz, et al., "Synthesis, Vibrational Spectra and X-Ray Structures of Copper(I) Thiourea Complexes", Inorganica Chimica Acta, vol. 357, 2004, 513-525.
Bouffard, et al., "Use of Lignosulfonate for Elemental Sulfur Biooxidation and Copper Leaching", Minerals Engineering, vol. 22, 2009, 100-103.
Bowmaker, Graham A., "Crystal Structures and Vibrational Spectroscopy of Copper(I) Thiourea Complexes", Inorganic Chemistry, vol. 48, No. 1, Jan. 5, 2009, 350-368.
Castineiras, et al., "Thione Complexes of Group IIB Dihalides, X-Ray Crystal Structure of Cd(ETTC)212", Polyhedron, vol. 7, No. 24, 1988, 2503-2508.
Cerda, C. P., et al., "Effect of Pretreatment on Leaching Primary Copper Sulfide in Acid-Chloride Media", Minerals, vol. 8, No. 1, 2018, 1.
Chen, et al., "A Study of the Leaching of Gold and Silver by Acidothioureation", Hydrometallurgy, vol. 5, 1980, 207-212.
Deschenes, G., et al., "Leaching of gold from a chalcopyrite concentrate by thiourea", Hydrometallurgy, vol. 20, No. 2, Jan. 1, 1988, 179-202.
Dixon, et al., "Mathematical Modeling of Heap Leaching Under Drip Irrigation", The Southern Institute of Mining and Metallurgy Percolation Leaching: The Status globally and in southern Africa, 2011, 1-29.
Doona, Christopher J., et al., "Equilibrium and redox kinetics of copper(II)-thiourea complexes", Inorganic Chemistry, vol. 35, No. 11, May 22, 1996, 3210-3216.
Duncan, et al., "Leaching of Chalcopyrite with Thiobacillus Ferroxidans: Effect of Surfactants and Shaking", applied Microbiology, vol. 12, No. 2, 1964, 122-126.
Fiscor, "Pinto Valley's Optimization Program Pays Big Dividends", Arizona Mining, 2021, AZ4-AZ8.
Garcia, et al., "Elemtal Sulfur Coarsening Kinetics", Geochemical Transactions, vol. 15, No. 11, 2014.
Garcia, et al., "Growth of Thiobacillus Ferrooxidens on Solid Medium: Effects of Some Surface Active Agents on Colony Formation", J. Gen. Appl. Microbiol., vol. 38, 1992, 279-282.
Ghadiri, et al., "Effect of Surfactant on the Growth and Activity of Microorganisms in a Heap Bioleaching System", Minerals Engineering, vol. 139, 2019, 43-51.
Ghahremaninezhad, et al., "Electrochemical Evaluation of the Surface of Chalcopyrite during Dissolution in Sulfuric Acid Solution", Electrochimica Acta, vol. 55, 2010, 5041-5056.
Grgorova, B., et al., "Simultaneous determination of thioreau and formamidine disulphide, using reversed-phase high-performance liquid chromatography and a UV detector", Journal of Chromatography A., vol. 368, 1986, 444-449.
Groenewald, et al., "The Dissolution of Gold in Acidic Solutions of Thiourea", Hydrometallurgy, vol. 1, 1976, 277-290.
Hackl, et al., "Passivation of Chalcopyrite During Oxidative Leaching in Sulfate Media", Hydrometallurgy, vol. 39, 1995, 25-48.
Hiroyoshi, et al., "Effects of Several Inhibitors to Thiobacillus Ferroxidans on Ferrous Promoted Chalcopyrite Leaching", Shigento-Sozal, vol. 115, 1999, 172-176.
Hiroyoshi, et al., "Enhancement in Bacterial Leaching of Chalcopyrite by Polyoxyethylene Sorbitan Monolaurate Addition", Shigento-Sozi, vol. 111, 1995.
Itakura, et al., "Branching Mechanism of Intergranular Crack Propagation in Three Dimensions", Physical Review E, vol. 71, 2005, 055102-1-4.
Jansons, "Dithiocarboxylic Acids, Their Esters, and Metal Dithiocarboxylates", Russian Chemical Reviews, vol. 45, No. 11, 1976, 1035-1051.
Kingma, et al., "Autotrophic Growth of Thiobacillus acidophilus in the Presence of a Furace-Active Agent, Tween 80", Applied and Environmental Microbiology, vol. 38, No. 5, 1979, 795-799.
Kirshnamoorthy, et al., "Adsorption Modeling of Catalyzed Heap Leaching", Second Canada-China Nonferrous Metallurgy Forum, Poster Abstract, 2019.
Krishnamoorthy, et al., "Modeling Solute Distribution in a Column", Second Canada-China Nonferrous Metallurgy Forum, Poster, 2019.
Leonida, et al., "Disruptive Metallurgy for Cleaner, Greener Battery Metals", Engineering & Mining Journal, 2021, 34-39.
Li, J., et al., "Reaction kinetics for gold dissolution in acid thiourea solution using formamidine disulfide as oxidant", Hydrometallurgy, vol. 63, Elsevier Science B.V., 2002, 215-223.
Lu, Z. Y., et al., "The effect of chloride ions on the dissolution of chalcopyrite in acidic solutions", Hydrometallurgy, vol. 56, No. 2, 2000, 189-202.
Mironov, I V, et al., "Complexation of copper(I) by thiourea in acidic aqueous solution", J Solution Chem, vol. 25, No. 3, Mar. 1996, 315-325.
Montero, et al., "A Solute Transport Model for the Acid Leaching of Copper in Soil Columns", Soil Sci. Soc. Am. J., vol. 58, 1994, 678-686.
Okazaki, et al., "First Isolation of a Stable Aliphatic Thioaldehyde, Tris(trimethlsilyl)ethanethial", J. Am. Chem. Soc., vol. 109, 1987, 279-280.

(56) References Cited

OTHER PUBLICATIONS

Okazaki, et al., "Synthesis of 2,4,6-Tri-t-Butylthiobenzaldehyde, the First Stable Thiobenzaldehyde", J. Chem. Soc., Chem Commun., vol. 105, 1982, 1187-1188.

Olvera, et al., "Electrochemical Dissolution of Chalcopyrite in the Presence of Thiourea and Formamidine Disulfide", Hydrometallurgy, vol. 179, 2018, 110-117.

Oraby, Elsayed A., "Gold Leaching in Thiosulfate Solutions and Its Environmental Effects Compared with Cyanide", Thesis from Curtin University of Technology, 2009.

Orgul, S, et al., "Gold Extraction from Kaymaz Gold Ore by Thiourea Leaching", Proceedings of the XXI International Mineral Processing Congress, Hydro and Biohydrometallurgy, vol. 13, 2000, C6-22-C6-28.

Peng, et al., "Effect of Furfactant Tween-80 on Sulfur Oxidation and Expressions of Sulfur Metabolism Relevant Genes of Acidithiobacillus Ferroxidans", Transactions of Nonferrous Metals Society of China, vol. 22, 2012, 3147-3155.

Piro, et al., "Two Thiourea-Containing Gold(I) Complexes", Acta Cryst., C58, 2002, m252-m255.

Quezada, V., et al., "Effect of pretreatment prior to leaching on a chalcopyrite mineral in acid media using NaCl and KNO3", Journal of Materials Research and Technology, vol. 9, No. 5, 2020, 10316-10324.

Reguly, "New Technologies Speed Low-Carbon Future", The Globe and Mail, 2021, B8.

Ren, "Catalystic Effect of Ethylene Thiourea on the Leaching of Calcopyrite", Hydrometallurgy, vol. 196, 2020, 105410-1-9.

Ren, et al., "Depassivation of Chalcopyrite with Jetti Catalyst", Second Canada-China Nonferrous Metallurgy Forum, Poster, 2019.

Sand, "The Influence of Four Detergents on the Substrate Oxidation by Thiobacillus Ferrooxidans", Environmental Technolog Letters, vol. 6, 1985, 439-444.

Sandoval, et al., "Effect of Nonionic Surfactants on Chalcopyrite Leaching Under Dump Chemical Conditions", Report of Investigations, Bureau of Mines, 1990.

Selim, et al., "Modeling Nonlinear Kinetic Behavior of Copper Adsorption-Desorption in Soil in Physical and Chemical Processes of Water and Solute Transport/Retention in Soil", SSA Special Publication No. 56, 555A, Madison, WI, 2001, 189-212.

* cited by examiner

EXTRACTION OF BASE METALS USING CARBONACEOUS MATTER AND A THIOCARBONYL FUNCTIONAL GROUP REAGENT

CROSS-REFERENCE TO RELATED APPLICATIONS

The present disclosure claims the benefit of priority from U.S. provisional application No. 63/080,549 filed on Sep. 18, 2020, the contents of which are incorporated herein by reference in their entirety.

FIELD

The present disclosure relates to the use of carbonaceous matter and a reagent comprising a thiocarbonyl functional group, for example, in processes/methods for extracting a base metal such as copper from a material comprising the base metal.

BACKGROUND

Chalcopyrite, a copper iron sulfide having the chemical formula $CuFeS_2$ accounts for approximately 70% of known copper reserves. Hydrometallurgical processing accounts for approximately 20% of copper produced worldwide but it is not currently used for chalcopyrite ores. Rather, pyrometallurgical methods are used for concentrates of these ores.

Aqueous processing of minerals may present several advantages over pyrometallurgical approaches, particularly when dealing with complex and/or low-grade ores. The main disadvantage of known hydrometallurgical processes/methods, when applied to chalcopyrite and some other sulfide ores, is the low extraction rates.

Carbonaceous matter is known to catalyze the leaching extraction of copper. For example, previous literature has shown that it can facilitate the leaching of various kinds of copper minerals including chalcopyrite and enargite ($Cu_3AsS_4$). It has also been shown that a thiocarbonyl compound can increase the extraction of metal sulfides in an acidic ferric environment. However, it remains desirable to develop new processes/methods where high copper extractions are achieved in shorter timescales that are of industrial interest.

SUMMARY

A hydrometallurgical process/method for extracting base metals such as copper from materials such as copper sulfide ores using a reagent having/comprising a thiocarbonyl functional group and carbonaceous matter as enhancers for the process/method is described herein. In the examples described in greater detail below, the use of the reagent having/comprising the thiocarbonyl functional group with the carbonaceous matter created a synergistic effect which enhanced copper extraction in comparison to use of either reagent alone.

Accordingly, the present disclosure includes a process for extracting a base metal from a material comprising the base metal, the process comprising contacting the material under acidic conditions with carbonaceous matter and a reagent having a thiocarbonyl functional group. The present disclosure also includes a method for extracting a base metal from a material comprising the base metal, the method comprising contacting the material under acidic conditions with carbonaceous matter and a reagent comprising a thiocarbonyl functional group.

In an embodiment, the material is contacted with the carbonaceous matter and the reagent comprising the thiocarbonyl functional group by a method comprising:
combining the carbonaceous matter with the material; and
contacting the combined carbonaceous matter and material with an acidic mixture comprising the reagent comprising the thiocarbonyl functional group.

In an embodiment, the carbonaceous matter is agglomerated with the material.

In an embodiment, the acidic mixture further comprises an oxidizing agent. In another embodiment, the oxidizing agent comprises ferric sulfate.

In an embodiment, the material further comprises iron-oxidizing bacteria.

In an embodiment, the acidic mixture further comprises iron-oxidizing bacteria.

In an embodiment, the material is a material comprising a base metal sulfide.

In an embodiment, the material comprises an ore.

In an embodiment, the base metal comprises copper.

In an embodiment, the material comprises a copper sulfide ore. In another embodiment, the copper sulfide ore comprises chalcopyrite, bornite, enargite, covellite, chalcocite, a copper sulfide of the formula $Cu_xS_y$ wherein the x:y ratio is between 1 and 2 or combinations thereof. In a further embodiment, the copper sulfide ore comprises chalcopyrite.

In an embodiment, the method comprises adding sulfuric acid to obtain the acidic conditions. In another embodiment, prior to the contact, the pH of the acidic mixture is in a range of from about 1.5 to about 2.5. In a further embodiment, the pH of the acidic mixture is about 2.

In an embodiment, the reagent comprising the thiocarbonyl functional group is added to the method in monomeric form. In another embodiment, the reagent comprising the thiocarbonyl functional group is added to the method in the form of the corresponding dimer.

In an embodiment, the reagent comprising the thiocarbonyl functional group comprises thiourea, ethylene thiourea, thioacetamide, sodium dimethyldithiocarbamate, trithiocarbonate, thiosemicarbazide or combinations thereof. In another embodiment, the reagent comprising the thiocarbonyl functional group comprises thiourea.

In an embodiment, the carbonaceous matter comprises carbon black, activated carbon, graphite, carbon anode scrap, charcoal, coal, solid organic carbon, carbon naturally present in the material comprising the base metal or combinations thereof. In another embodiment, the carbonaceous matter comprises carbon black particles.

In an embodiment, the material is contacted with the carbonaceous matter and the reagent comprising the thiocarbonyl functional group in a method comprising a percolation leach, a tank leach, or a vat leach. In another embodiment, the percolation leach is a heap, a dump or a column leach. In a further embodiment, the material is contacted with the carbonaceous matter and the reagent comprising the thiocarbonyl functional group in a method comprising a heap leach.

In an embodiment, the method further comprises recovering the base metal. In an embodiment, the contacting of the material with the carbonaceous matter and the reagent comprising the thiocarbonyl functional group produces a pregnant leach solution comprising the base metal and the method further comprises recovering the base metal from the pregnant leach solution. In an embodiment, the recovering comprises solvent extraction and electrowinning. In another embodiment, prior to the recovering, the method further comprises a solid-liquid separation. In an embodiment, the method further comprises recovering the reagent comprising the thiocarbonyl functional group. In another embodiment, the method further comprises recycling the recovered reagent comprising the thiocarbonyl functional group for use in the contacting of a further portion of the material.

In an embodiment, the material is contacted with the carbonaceous matter and the reagent comprising the thiocarbonyl functional group at ambient temperature and pressure.

In an embodiment, the method comprises a batch method.

In an embodiment, the method comprises a continuous method.

The present disclosure also includes a use of carbonaceous matter and a reagent having a thiocarbonyl functional group in a process for extracting a base metal from a material comprising the base metal. In an embodiment, the process is a process for extracting a base metal from a material comprising the base metal as described herein. The present disclosure also includes a use of carbonaceous matter and a reagent comprising a thiocarbonyl functional group in a method for extracting a base metal from a material comprising the base metal. In an embodiment, the method is a method for extracting a base metal from a material comprising the base metal as described herein.

The present disclosure also includes a use of carbonaceous matter and a reagent having a thiocarbonyl functional group for extracting a base metal from a material comprising the base metal, wherein the material is contacted under acidic conditions with the carbonaceous matter and the reagent having the thiocarbonyl functional group. The present disclosure also includes a use of carbonaceous matter and a reagent comprising a thiocarbonyl functional group for extracting a base metal from a material comprising the base metal, wherein the material is contacted under acidic conditions with the carbonaceous matter and the reagent comprising the thiocarbonyl functional group.

In an embodiment, the material is contacted with the carbonaceous matter and the reagent comprising the thiocarbonyl functional group by a method comprising: combining the carbonaceous matter with the material; and contacting the combined carbonaceous matter and material with an acidic mixture comprising the reagent comprising the thiocarbonyl functional group.

In an embodiment, the acidic mixture further comprises an oxidizing agent. In another embodiment, the oxidizing agent comprises ferric sulfate.

In an embodiment, the material further comprises iron-oxidizing bacteria.

In an embodiment, the acidic mixture further comprises iron-oxidizing bacteria.

In an embodiment, the material is a material comprising a base metal sulfide.

In an embodiment, the material comprises an ore.

In an embodiment, the base metal comprises copper.

In an embodiment, the material comprises a copper sulfide ore. In another embodiment, the copper sulfide ore comprises chalcopyrite, bornite, enargite, covellite, chalcocite, a copper sulfide of the formula $Cu_xS_y$ wherein the x:y ratio is between 1 and 2 or combinations thereof. In a further embodiment, the copper sulfide ore comprises chalcopyrite.

In an embodiment, sulfuric acid is added to obtain the acidic conditions. In another embodiment, prior to the contact, the pH of the acidic mixture is in a range of from about 1.5 to about 2.5. In a further embodiment, the pH of the acidic mixture is about 2.

In an embodiment, the reagent comprising the thiocarbonyl functional group is added in monomeric form. In another embodiment, the reagent comprising the thiocarbonyl functional group is added in the form of the corresponding dimer.

In an embodiment, the reagent comprising the thiocarbonyl functional group comprises thiourea, ethylene thiourea, thioacetamide, sodium dimethyldithiocarbamate, trithiocarbonate, thiosemicarbazide or combinations thereof. In another embodiment, the reagent comprising the thiocarbonyl functional group comprises thiourea.

In an embodiment, the carbonaceous matter comprises carbon black, activated carbon, graphite, carbon anode scrap, charcoal, coal, solid organic carbon, carbon naturally present in the material comprising the base metal or combinations thereof. In another embodiment, the carbonaceous matter comprises carbon black particles.

In an embodiment, the material is contacted with the carbonaceous matter and the reagent comprising the thiocarbonyl functional group at ambient temperature and pressure.

The present disclosure also includes a method of recovering at least one base metal from a material comprising the at least one base metal, the method comprising: contacting the material under acidic conditions with a reagent comprising a thiocarbonyl functional group and carbonaceous matter to produce a pregnant solution comprising the at least one base metal; and recovering the at least one base metal from the pregnant solution.

The present disclosure also includes a method of recovering at least one base metal from a material comprising the at least one base metal, the method comprising: contacting the material under acidic conditions with FDS and carbonaceous matter to produce a pregnant solution comprising the at least one base metal ion; and recovering the at least one base metal from the pregnant solution.

The present disclosure also includes a use of carbonaceous matter and a reagent comprising a thiocarbonyl group for extracting at least one base metal from a material comprising the at least one base metal, wherein the material is contacted under acidic conditions with the reagent comprising the thiocarbonyl functional group and the carbonaceous matter.

The present disclosure also includes a use of carbonaceous matter and FDS for extracting at least one base metal from a material comprising the at least one base metal, wherein the material is contacted under acidic conditions with the FDS and the carbonaceous matter.

Other features and advantages of the present disclosure will become apparent from the following detailed description. It should be understood, however, that the detailed description and the specific examples, while indicating embodiments of the disclosure, are given by way of illustration only and the scope of the claims should not be limited by these embodiments, but should rather be given the broadest interpretation consistent with the description as a whole.

BRIEF DESCRIPTION OF THE DRAWINGS

The embodiments of the disclosure will now be described in greater detail with reference to the attached drawings, in which.

DETAILED DESCRIPTION

I. Definitions

Figure 1:
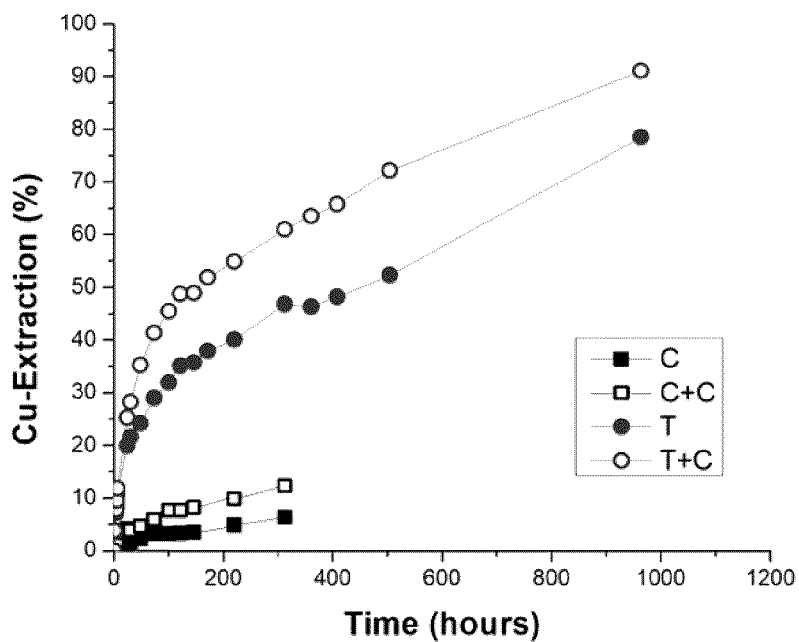
FIG. 1 is a graph showing the synergistic effect of adding thiourea (2 mM) and carbon black (1 g/L) in a method for copper extraction from natural chalcopyrite ore according to an embodiment of the present disclosure (T+C) in comparison to a control method without either thiourea or carbon black (C), a control method with carbon black (C+C) and a control method with thiourea (T) according to comparative examples of the present disclosure.

Unless otherwise indicated, the definitions and embodiments described in this and other sections are intended to be applicable to all embodiments and aspects of the disclosure herein described for which they would be understood to be suitable by a person skilled in the art.

As used herein, the words "comprising" (and any form thereof, such as "comprise" and "comprises"), "having" (and any form thereof, such as "have" and "has"), "including" (and any form thereof, such as "include" and "includes") or "containing" (and any form thereof, such as "contain" and "contains"), are inclusive or open-ended and do not exclude additional, unrecited elements or process/method steps.

Terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the term it modifies.

As used in this disclosure, the singular forms "a", "an" and "the" include plural references unless the content clearly dictates otherwise.

The term "and/or" as used herein means that the listed items are present, or used, individually or in combination. In effect, this term means that "at least one of" or "one or more" of the listed items is present or used.

II. Processes/Methods and Uses

A hydrometallurgical process/method for extracting base metals such as copper from materials such as copper sulfide ores using a reagent having/comprising a thiocarbonyl functional group and carbonaceous matter as enhancers for the process/method is described herein. In the examples described in greater detail below, the use of the reagent having/comprising the thiocarbonyl functional group with the carbonaceous matter created a synergistic effect which enhanced copper extraction in comparison to use of either reagent alone.

Accordingly, the present disclosure includes a process for extracting a base metal from a material comprising the base metal, the process comprising contacting the material under acidic conditions with carbonaceous matter and a reagent having a thiocarbonyl functional group. The present disclosure also includes a method for extracting a base metal from a material comprising the base metal, the method comprising contacting the material under acidic conditions with carbonaceous matter and a reagent comprising a thiocarbonyl functional group. It will be appreciated by a person skilled in the art that the terms "process" and "method" may be used interchangeably in reference to the embodiments of the present disclosure.

In an embodiment, contacting of the material with the carbonaceous matter and the reagent having the thiocarbonyl functional group produces a pregnant leach solution comprising the base metal. Accordingly, the present disclosure also includes a process for extracting (e.g., leaching) and optionally recovering a base metal from a material comprising the base metal, the process comprising: contacting the material under acidic conditions with carbonaceous matter and a reagent having a thiocarbonyl functional group to obtain a pregnant leach solution comprising the base metal; and optionally recovering the base metal from the pregnant leach solution. In an embodiment, the process comprises recovering the base metal from the pregnant leach solution. Accordingly, the present disclosure also includes a process for extracting (e.g., leaching) and recovering a base metal from a material comprising the base metal, the process comprising: contacting the material under acidic conditions with carbonaceous matter and a reagent having a thiocarbonyl functional group to obtain a pregnant leach solution comprising the base metal; and recovering the base metal from the pregnant leach solution. The present disclosure also includes a method of recovering at least one base metal from a material comprising the at least one base metal, the method comprising: contacting the material under acidic conditions with a reagent comprising a thiocarbonyl functional group and carbonaceous matter to produce a pregnant solution comprising the at least one base metal; and recovering the at least one base metal from the pregnant solution. In another embodiment, the process does not comprise recovering the base metal from the pregnant leach solution. Accordingly, the present disclosure also includes a process for extracting (e.g., leaching) a base metal from a material comprising the base metal, the process comprising: contacting the material under acidic conditions with carbonaceous matter and a reagent having a thiocarbonyl functional group to obtain a pregnant leach solution comprising the base metal.

The material is contacted with the carbonaceous matter and the reagent having the thiocarbonyl functional group by any suitable process/method.

In an embodiment of the present disclosure, the material is contacted with the carbonaceous matter and the reagent having the thiocarbonyl functional group by a process comprising: combining the carbonaceous matter with the material; and contacting the combined carbonaceous matter and material with an acidic mixture comprising the reagent having the thiocarbonyl functional group. In an embodiment, the carbonaceous matter is agglomerated with the material. Processes/methods for agglomerating are well known in the art and a suitable process/method for agglomeration of the carbonaceous matter and the material can be selected by the skilled person.

In an alternative embodiment of the present disclosure, the material is contacted with the carbonaceous matter and the reagent having the thiocarbonyl functional group by a process comprising: contacting the material with an acidic mixture comprising the carbonaceous matter and the reagent having the thiocarbonyl functional group.

In some embodiments, the acidic mixture further comprises an oxidizing agent. The oxidizing agent can be any suitable oxidizing agent or combination thereof, the selection of which can be made by a person skilled in the art. In an embodiment, the oxidizing agent comprises oxygen, a source of $Fe^{3+}$ ions or combinations thereof. In another embodiment, the oxidizing agent comprises a source of $Fe^{3+}$ (ferric) ions. The term "source" as used herein in reference to $Fe^{3+}$ ions may include both direct sources of $Fe^{3+}$ ions and indirect sources of $Fe^{3+}$ ions, as appropriate. The term "direct source" as used herein in reference to a source of $Fe^{3+}$ ions refers to a substance such as a suitable water-soluble iron(III) salt that directly releases the $Fe^{3+}$ ions upon dissolution in an aqueous environment such as the acidic mixtures of the present disclosure. The term "indirect source" as used herein in reference to a source of $Fe^{3+}$ ions refers to a source such as a suitable water soluble iron(II) salt that releases a substance such as $Fe^{2+}$ ions upon dissolution in an aqueous environment such as the acidic mixtures of the present disclosure that can be converted into the $Fe^{3+}$ ions e.g., by an electrochemical process/method. For example, the oxidizing agent can comprise a water-soluble salt such as ferric sulfate (also known as iron (III) sulfate or $Fe_2(SO_4)_3$) that can act as a direct source of $Fe^{3+}$ ions and/or a water-soluble salt such as ferrous sulfate (also known as iron (II) sulfate or $FeSO_4$) that acts as a direct source of $Fe^{2+}$ ions that can, for example, be oxidized into $Fe^{3+}$ ions e.g., by iron-oxidizing bacteria. In another embodiment, the oxidizing agent comprises ferric sulfate. In another embodiment, the source of ferric ions comprises ferric ions generated at least in part by iron-oxidizing bacteria. In an embodiment, the acidic mixture comprises a ferric solution. In another embodiment, the acidic mixture comprises a ferric sulfate solution. In a further embodiment, the acidic mixture comprises a ferric media. In another embodiment, the acidic mixture comprises a ferrous sulfate solution. In another embodiment, the ferrous sulfate solution provides a source of $Fe^{3+}$ ions that are oxidized to $Fe^{3+}$ ions by iron-oxidizing bacteria. The concentration of the oxidizing agent such as ferric sulfate in the acidic mixture can be any suitable concentration. In an embodiment, prior to the material being contacted with the carbonaceous matter and the reagent having the thiocarbonyl functional group, the oxidizing agent e.g., ferric sulfate is present in the acidic mixture at a concentration of less than 10 g/L of $Fe^{3+}$. In another embodiment, prior to the material being contacted with the carbonaceous matter and the reagent having the thiocarbonyl functional group, the oxidizing agent e.g., ferric sulfate is present in the acidic mixture at a concentration of from about 0.5 g/L to about 40 g/L, about 1.5 g/L to about 3 g/L or about 2 g/L to about 2.5 g/L of $Fe^{3+}$.

In some embodiments, the material comprising the base metal (e.g., a base metal sulfide ore) further comprises iron-oxidizing bacteria. In some embodiments, the acidic mixture further comprises iron-oxidizing bacteria. The iron-oxidizing bacteria can be any suitable iron-oxidizing bacteria or combination (consortium) thereof, the selection of which can be made by a person skilled in the art. In an embodiment, the iron-oxidizing bacteria comprise *Acidothiobacilos ferrooxidans*.

The material comprising the base metal is any suitable material comprising a base metal or combination thereof extractable by the processes/methods of the present disclosure. For example, in an embodiment, the material comprising the base metal is a material comprising a base metal sulfide, electronic waste (e.g., waste printed circuit boards) comprising a base metal, or any other suitable material comprising a base metal or combinations thereof. In another embodiment, the material comprising the base metal comprises waste printed circuit boards, batteries or any other suitable base metal-containing waste or other materials or combinations thereof. In an embodiment, the material comprising the base metal is a material comprising a base metal sulfide.

The term "base metal" as used herein refers to any suitable metal or combination thereof that does not comprise a precious metal (e.g., gold or platinum). For example, suitable base metals may include but are not limited to copper, nickel, iron, aluminum, lead, zinc, tin, tungsten (also sometimes referred to as wolfram), molybdenum, tantalum, magnesium, cobalt, bismuth, cadmium, titanium, zirconium, antimony, manganese, beryllium, chromium, germanium, vanadium, gallium, hafnium, indium, niobium (also sometimes referred to as columbium), rhenium, thallium and combinations thereof. In an embodiment, the base metal comprises copper, nickel, zinc or combinations thereof. In another embodiment, the base metal comprises copper. In an embodiment, the material comprises an ore. In another embodiment, the material comprises a concentrate. In an embodiment, the material comprises a copper sulfide ore. In another embodiment, the copper sulfide ore is a primary copper sulfide (e.g., chalcopyrite, bornite, enargite or combinations thereof), a secondary copper sulfide (e.g., covellite, chalcocite or combinations thereof) or combinations thereof. In an embodiment, the copper sulfide ore comprises a primary copper sulfide. In another embodiment, the copper sulfide ore comprises a secondary copper sulfide. In a further embodiment, the copper sulfide ore comprises a combination of a primary copper sulfide and a secondary copper sulfide. In another embodiment, the copper sulfide ore comprises chalcopyrite, bornite, enargite, covellite, chalcocite, a copper sulfide of the formula $Cu_xS_y$ wherein the x:y ratio is between 1 and 2 or combinations thereof. In an embodiment, the copper sulfide of the formula $Cu_xS_y$ wherein the x:y ratio is between 1 and 2 is chalcocite, djurleite, digenite or combinations thereof. In another embodiment, the copper sulfide ore comprises chalcopyrite. Base metal sulfide ores other than copper sulfide ores are well known to the person skilled in the art. In an embodiment, the material comprises a nickel sulfide ore. In another embodiment, the nickel sulfide ore comprises pentlandite, violarite or combinations thereof.

The acidic conditions are any suitable acidic conditions, the selection of which can be made by a person skilled in the art. In some embodiments, the process comprises adding sulfuric acid to obtain the acidic conditions. In an embodiment, prior to the contact, the pH of the acidic mixture is in a range of from about 0.5 to about 4, about 1 to about 3, or about 1.5 to about 2.5. In another embodiment, the pH of the acidic mixture is about 2.

The terms "reagent having a thiocarbonyl functional group" and "reagent comprising a thiocarbonyl functional group" as used herein are used interchangeably and refer to an organosulfur compound comprising a C=S functional group that can also be known in the art as a thione or thioketone. The reagent having the thiocarbonyl functional group can be any suitable reagent having a thiocarbonyl functional group. For example, suitable reagents having a thiocarbonyl functional group may feature a C=S functional group having a sulfur bearing a partial negative charge, bearing a negative electrostatic potential surface and having an empty π*-antibonding orbital as its lowest unoccupied molecular orbital (LUMO), provided that the reagent having the thiocarbonyl functional group is at least partially soluble in water and preferably does not significantly complex with the base metal and/or (if present) the oxidizing agent to form insoluble precipitates. Certain reagents having a thiocarbonyl functional group are capable of oxidizing to form the corresponding dimer. For example, thiourea, in the presence of a suitable oxidant such as ferric sulfate is capable of oxidizing to form the dimer formamidine disulfide (FDS). An equilibrium exists between FDS and thiourea in a ferric sulfate solution such that, for example, an acidic mixture prepared with a dimer of a reagent having a thiocarbonyl functional group (e.g., FDS) will provide the reagent having the thiocarbonyl functional group (e.g., thiourea) for contacting the material. Accordingly, in an embodiment, the reagent having the thiocarbonyl functional group is added to the process in the form of the corresponding dimer. The present disclosure also includes a method of recovering at least one base metal from a material comprising the at least one base metal, the method comprising: contacting the material under acidic conditions with FDS and carbonaceous matter to produce a pregnant solution comprising the at least one base metal ion; and recovering the at least one base metal from the pregnant solution. In an alternative embodiment of the present disclosure, the reagent having the thiocarbonyl functional group is added to the process in monomeric form (i.e. in the form of the reagent having the thiocarbonyl functional group).

In an embodiment, the reagent having the thiocarbonyl functional group is or comprises N-N' substituted thioureas; 2,5-dithiobiurea; dithiobiuret; thiosemicarbazide purum; thiosemicarbazide; thioacetamide; 2-methyl-3-thiosemicarbazide; 4-methyl-3-thiosemicarbazide; vinylene trithiocarbonate purum; vinylene trithiocarbonate; 2-cyanothioacetamide; ethylene trithiocarbonate; potassium ethyl xanthogenate; dimethylthiocarbamoyl chloride; dimethyldithiocarbamate; dimethyl trithiocarbonate; N,N-dimethylthioformamide; 4,4-dimethyl-3-thiosemicarbazide; 4-ethyl-3-thiosemicarbazide; O-isopropylxanthic acid; ethyl thiooxamate; ethyl dithioacetate; pyrazine-2-thiocarboxamide; diethylthiocarbamoyl chloride; diethyldithiocarbamate; tetramethylthiuram monosulfide; tetramethylthiuram disulfide; pentafluorophenyl chlorothionoformate; 4-fluorophenyl chlorothionoformate; O-phenyl chlorothionoformate; phenyl chlorodithioformate; 3,4-difluorothiobenzamide; 2-bromothiobenzamide; 3-bromothiobenzamide; 4-bromothiobenzamide; 4-chlorothiobenzamide; 4-fluorothiobenzamide; thiobenzoic acid; thiobenzamide; 4-phenylthiosemicarbazide; O-(p-tolyl) chlorothionoformate; 4-bromo-2-methylthiobenzamide; 3-methoxythiobenzamide; 4-methoxythiobenzamide; 4-methylbenzenethioamide; thioacetanilide; salicylaldehyde thiosemicarbazone; indole-3-thiocarboxamide; S-(thiobenzoyl)thioglycolic acid; 3-(acetoxy)thiobenzamide; 4-(acetoxy)thiobenzamide; methyl N'-[(e)-(4-chlorophenyl)methylidene]hydrazonothiocarbamate; 3-ethoxythiobenzamide; 4-ethylbenzene-l-thiocarboxamide; tert-butyl 3-[(methylsulfonyl)oxy]-1-azetanecarboxylate; diethyldithiocarbamic acid; 2-(phenylcarbonothioylthio)-propanoic acid; 2-hydroxybenzaldehyde N-ethylthiosemicarbazone; (1R,4R)-1,7,7-trimethylbicyclo[2.2.1]heptane-2-thione; tetraethylthiuram disulfide; 4'-hydroxybiphenyl-4-thiocarboxamide; 4-biphenylthioamide; dithizone; 4'-methylbiphenyl-4-thiocarboxamide; tetraisopropylthiuram disulfide; anthracene-9-thiocarboxamide; phenanthrene-9-thiocarboxamide; sodium dibenzyldithiocarbamate; 4,4'-bis(dimethylamino)thiobenzophenone; or combinations thereof. In an embodiment, the reagent having the thiocarbonyl functional group comprises thiourea, ethylene thiourea, thioacetamide, sodium dimethyldithiocarbamate, trithiocarbonate, thiosemicarbazide or combinations thereof. In another embodiment, the reagent having the thiocarbonyl functional group comprises thiourea. In an embodiment, the reagent having the thiocarbonyl functional group is not thiourea.

The concentration of the reagent having the thiocarbonyl functional group in the acidic mixture can be any suitable concentration. In embodiments wherein the reagent having the thiocarbonyl functional group is added to the process/method in the form of the corresponding dimer, the concentrations specified herein for the reagent having the thiocarbonyl functional group refers to a concentration calculated as if all of the dimer was dissociated into the reagent having the thiocarbonyl functional group. In an embodiment, prior to the material being contacted with the carbonaceous matter and the reagent having the thiocarbonyl functional group, the reagent having the thiocarbonyl functional group is present in the acidic mixture at a concentration of about 0.002 mM or greater, about 0.02 mM or greater, about 0.1 mM or greater, about 0.2 mM or greater, about 0.25 mM or greater, about 0.3 mM or greater, about 0.4 mM or greater, about 0.5 mM or greater, about 0.6 mM or greater, about 0.7 mM or greater, about 0.8 mM or greater, about 0.9 mM or greater, about 1.0 mM or greater, about 1.5 mM or greater, about 2 mM or greater, about 2.5 mM or greater, about 3 mM or greater, about 4 mM or greater, about 5 mM or greater, about 10 mM or greater, about 20 mM or greater, about 30 mM or greater, or about 60 mM or greater. In an embodiment, prior to the material being contacted with the carbonaceous matter and the reagent having the thiocarbonyl functional group, the reagent having the thiocarbonyl functional group is present in the acidic mixture at a concentration of about 100 mM or lower, about 60 mM or lower or about 30 mM or lower. In another embodiment, prior to the material being contacted with the carbonaceous matter and the reagent having the thiocarbonyl functional group, the reagent having the thiocarbonyl functional group is present in the acidic mixture at a concentration of about 20 mM or lower. In some embodiments, a lower concentration of the reagent having the thiocarbonyl functional group is used. Accordingly, in another embodiment, prior to the material being contacted with the carbonaceous matter and the reagent having the thiocarbonyl functional group, the reagent having the thiocarbonyl functional group is present in the acidic mixture at a concentration of about 10 mM or lower, about 5 mM or lower, about 4 mM or lower, about 3 mM or lower, about 2.5 mM or lower, about 2 mM or lower, about 1.5 mM or lower, about 1.0 mM or lower, about 0.9 mM or lower, about 0.8 mM or lower, about 0.75 mM or lower, about 0.7 mM or lower, about 0.6 mM or lower, about 0.5 mM or lower, about 0.4 mM or lower, about 0.3 mM or lower, about 0.2 mM or lower, about 0.02 mM or lower, or about 0.002 mM or lower. It will be appreciated by a person skilled in the art that such embodiments can be interchanged in any suitable manner. For example, in another embodiment, prior to the material being contacted with the carbonaceous matter and the reagent having the thiocarbonyl functional group, the reagent having the thiocarbonyl functional group is present in the acidic mixture at a concentration of from about 0.002 mM to about 100 mM, about 0.2 mM to about 100 mM, about 0.2 mM to about 20 mM, about 0.1 mM to about 10 mM, about 0.2 mM to about 10 mM, about 0.2 mM to about 5 mM, about 0.2 mM to about 4 mM, about 0.2 mM to about 3 mM, about 0.25 mM to about 2.5 mM, about 0.2 mM to about 2 mM, about 0.2 mM to about 1.5 mM, about 0.2 mM to about 1.0 mM, about 0.2 mM to about 0.5 mM, about 0.25 mM to about 0.75 mM, about 1.5 mM to about 2.5 mM, about 0.5 mM or about 2 mM.

The concentration of the FDS in the acidic conditions can be any suitable concentration. The concentrations specified hereinbelow for FDS refer to a concentration calculated as if no FDS was dissociated into thiourea. In an embodiment, the FDS is comprised in the acidic conditions at a concentration of about 0.001 mM or greater, about 0.01 mM or greater, about 0.05 mM or greater, about 0.1 mM or greater, about 0.125 mM or greater, about 0.15 mM or greater, about 0.2 mM or greater, about 0.25 mM or greater, about 0.3 mM or greater, about 0.35 mM or greater, about 0.4 mM or greater, about 0.45 mM or greater, about 0.5 mM or greater, about 0.75 mM or greater, about 1 mM or greater, about 1.25 mM or greater, about 1.5 mM or greater, about 2 mM or greater, about 2.5 mM or greater, about 5 mM or greater, about 10 mM or greater, about 15 mM or greater, or about 30 mM or greater. In an embodiment, the FDS is comprised in the acidic conditions at a concentration of about 50 mM or lower, about 30 mM or lower, or about 15 mM or lower. In another embodiment, the FDS is comprised in the acidic conditions at a concentration of about 10 mM or lower. In some embodiments, a lower concentration of the FDS is used. Accordingly, in another embodiment of the present disclosure, the FDS is comprised in the acidic conditions at a concentration of about 5 mM or lower, about 2.5 mM or lower, about 2 mM or lower, about 1.5 mM or lower, about 1.25 mM or lower, about 1 mM or lower, about 0.75 mM or lower, about 0.5 mM or lower, about 0.45 mM or lower, about 0.4 mM or lower, about 0.375 mM or lower, about 0.35 mM or lower, about 0.3 mM or lower, about 0.25 mM or lower, about 0.2 mM or lower, about 0.15 mM or lower, about 0.1 mM or lower, about 0.01 mM or lower, or about 0.001 mM or lower. It will be appreciated by a person skilled in the art that such embodiments can be interchanged in any suitable manner. For example, in another embodiment, the FDS is comprised in the acidic conditions at a concentration in a range of about 0.001 mM to about 50 mM, about 0.001 mM to about 30 mM, about 0.001 mM to about 25 mM, about 0.001 mM to about 15 mM, about 0.001 mM to about 10 mM, about 0.001 mM to about 5 mM, about 0.001 mM to about 2.5 mM, about 0.001 mM to about 1 mM, about 0.001 mM to about 0.5 mM, about 0.001 mM to about 0.25 mM, about 0.001 mM to about 0.1 mM, about 0.001 mM to about 0.01 mM, about 0.01 mM to about 50 mM, about 0.01 mM to about 30 mM, about 0.01 mM to about 25 mM, about 0.01 mM to about 15 mM, about 0.01 mM to about 10 mM, about 0.01 mM to about 5 mM, about 0.01 mM to about 2.5 mM, about 0.01 mM to about 1 mM, about 0.01 mM to about 0.5 mM, about 0.01 mM to about 0.25 mM, about 0.01 mM to about 0.1 mM, about 0.1 mM to about 50 mM, about 0.1 mM to about 30 mM, about 0.1 mM to about 25 mM, about 0.1 mM to about 15 mM, about 0.1 mM to about 10 mM, about 0.1 mM to about 5 mM, about 0.1 mM to about 2.5 mM, about 0.1 mM to about 1 mM, about 0.1 mM to about 0.5 mM, about 0.1 mM to about 0.25 mM, about 1 mM to about 50 mM, about 1 mM to about 30 mM, about 1 mM to about 25 mM, about 1 mM to about 15 mM, about 1 mM to about 10 mM, about 1 mM to about 5 mM, about 5 mM to about 50 mM, about 5 mM to about 30 mM, about 5 mM to about 25 mM, about 5 mM to about 15 mM, about 5 mM to about 10 mM, about 15 mM to about 50 mM, about 15 mM to about 30 mM, about 15 mM to about 25 mM, about 25 mM to about 50 mM, or about 30 mM to about 50 mM.

The carbonaceous matter can be any suitable carbonaceous matter. For example, suitable carbonaceous matter is at least substantially, optionally fully insoluble and at least substantially, optionally fully a solid under the leaching conditions used in the processes/methods of the present disclosure and is optionally in the form of particles and/or chunks. It will be appreciated by the person skilled in the art that in some embodiments, for example, wherein the carbonaceous matter is agglomerated with the material, such particles or chunks may not exist as discrete particles or chunks but would, for example, be agglomerated together into a suitable mass. In an embodiment, the carbonaceous matter comprises carbon black, activated carbon, graphite, carbon anode scrap, charcoal, coal, solid organic carbon, carbon naturally present in the material comprising the base metal (e.g., an ore) or combinations thereof. In another embodiment, the carbonaceous matter comprises carbon black particles. The dosage and particle size of the carbonaceous matter can be any suitable dosage and particle size. For example, it will be appreciated by a person skilled in the art that in embodiments wherein iron-oxidizing bacteria are present, the dosage is compatible with the presence of such bacteria and is desirably selected such that no significant difference is observed in the growth and/or iron oxidation ability of the bacteria. In an embodiment of the present disclosure, the dosage of the carbonaceous matter is about 1 g or lower of carbonaceous matter per gram of ore. Advantageously, a lower dosage and finer particle size of the carbonaceous matter is used in order to maximize the contact between the material comprising the base metal sulfide (e.g., the chalcopyrite) and the carbonaceous matter. Accordingly, in another embodiment, the dosage of the carbonaceous matter is from about 0.001 g to about 0.25 g, about 0.01 g to about 0.1 g or about 0.05 g to about 0.1 g per gram of the base metal sulfide (e.g., chalcopyrite) in the material comprising the base metal sulfide. In another embodiment, the particle size of the carbonaceous matter is less than 500, 100 or 30 microns.

The material can be contacted with the carbonaceous matter and the reagent having the thiocarbonyl functional group using any suitable process/method and/or means, the selection of which can be made by a person skilled in the art. In an embodiment, the material is contacted with the carbonaceous matter and the reagent having a thiocarbonyl functional group in a process comprising a percolation leach (e.g., a heap leach, a dump leach or a column leach), a tank leach, a vat leach or a bioreactor. In an embodiment, the material is contacted with the carbonaceous matter and the reagent having a thiocarbonyl functional group in a process comprising a percolation leach (e.g., a heap leach, a dump leach or a column leach), a tank leach or a vat leach. In another embodiment, the percolation leach is a heap leach, a dump leach or a column leach. In an embodiment, the material is contacted with the carbonaceous matter and the reagent having the thiocarbonyl functional group in a process comprising a percolation leach. In another embodiment, the material is contacted with the carbonaceous matter and the reagent having the thiocarbonyl functional group in a process comprising a heap leach. In another embodiment, the material is contacted with the carbonaceous matter and the reagent having the thiocarbonyl functional group in a process comprising a dump leach. In another embodiment, the material is contacted with the carbonaceous matter and the reagent having the thiocarbonyl functional group in a process comprising a column leach. In another embodiment, the material is contacted with the carbonaceous matter and the reagent having the thiocarbonyl functional group in a process comprising a tank leach. In another embodiment, the material is contacted with the carbonaceous matter and the reagent having the thiocarbonyl functional group in a process comprising a vat leach. In another embodiment, the material is contacted with the carbonaceous matter and the reagent having the thiocarbonyl functional group in a process comprising a bioreactor. Suitable processes/methods, means and/or conditions for carrying out a percolation leach (e.g., a heap leach, a dump leach or a column leach), a tank leach, a vat leach or a leach in a bioreactor in the processes of the present disclosure can be selected by the person skilled in the art.

For example, the term "percolation leach" as used herein refers to a process in which the base metal is leached from the material by causing the acidic mixture to seep into and flow through a mass of the material (or, in some embodiments of the present disclosure, a mass of the material combined e.g., agglomerated with the carbonaceous matter).

The term "heap leach" as used herein refers to an example of a percolation leach which comprises heaping the material (such as the copper sulfide ore) onto a heap leach pad (e.g., an impermeable plastic or clay-lined leach pad), and contacting (e.g., irrigating via a means such as a sprinkler or drip irrigation) the heaped material with the acidic mixture in a way such that the acidic mixture percolates through the heap and leaches the base metal, for example, so as to obtain a pregnant leach solution comprising the base metal which can be collected. In heap leach processes, the material (such as the copper sulfide ore) is typically crushed subsequent to being removed from the ground and prior to being heaped. In an embodiment, the crushing is primary crushing. In another embodiment, the crushing is secondary crushing. In a further embodiment, the crushing is tertiary crushing. It will be appreciated by the person skilled in the art that in embodiments wherein the material is combined e.g., agglomerated with the carbonaceous matter, such combining e.g., agglomeration is carried out prior to the material (such as the copper sulfide ore) and the carbonaceous matter being heaped, and, in embodiments comprising crushing the material (such as the copper sulfide ore), subsequent to the crushing of the material.

The term "dump leach" as used herein refers to an example of a percolation leach having a process that is similar to a heap leach, but wherein the material (such as the copper sulfide ore) is not crushed prior to being stacked on the leach pad.

The term "column leach" as used herein refers to an example of a percolation leach which comprises loading the material (such as the copper sulfide ore) into a column then contacting (e.g., irrigating via a means such as drip irrigation from the top of the column) the material with the acidic mixture in a way such that the acidic mixture percolates through the material in the column and leaches the base metal, for example, so as to obtain a pregnant leach solution comprising the base metal which can be collected. In some embodiments, the material (such as the copper sulfide ore) is crushed prior to being loaded in the column. It will be appreciated by the person skilled in the art that in embodiments wherein the material is combined e.g., agglomerated with the carbonaceous matter, such combining e.g., agglomeration is carried out prior to the material (such as the copper sulfide ore) and the carbonaceous matter being loaded, and, in embodiments comprising crushing the material (such as the copper sulfide ore), subsequent to the crushing of the material. Column leaches can be useful, for example, for measuring the effects of typical variables encountered in industrial heap and/or dump leaching processes.

The terms "tank leach" and "vat leach" as used herein refer to processes in which the material (such as the copper sulfide ore) is placed into a tank or vat, respectively, containing the acidic mixture under conditions suitable to leach the base metal, for example, to obtain a pregnant leach solution comprising the base metal which can be collected. In exemplary tank leaching processes, the material (such as the copper sulfide ore) is typically ground to a fineness suitable to form a slurry or pulp, combined with water to form the slurry or pulp then pumped into the tank where subsequently the acidic mixture is added. In exemplary vat leaching processes, a coarser particle size of the material (such as the copper sulfide ore) is used which is loaded into the vat as a solid, then the acidic mixture is flooded into the vat.

In an embodiment, the material is at least partially disposed within a reactor. In another embodiment, the reactor comprises a bioreactor. In another embodiment, the material comprises a polished material. In another embodiment, the material is cut from a larger piece of material. In another embodiment, the method comprises agitating the material. In an embodiment, the material is agitated at about 50 rpm to about 500 rpm. In some embodiments, the contacting is for less than about 10 days. In some embodiments, the material is pulverized before contacting.

The person skilled in the art will appreciate that the term "acidic mixture" as used herein includes both an acidic aqueous solution and an acidic aqueous suspension, depending on the components comprised therein. The acidic mixture used in the various embodiments of the present disclosure can readily be prepared by the person skilled in the art having regard to the present disclosure by combining the various components therein by a suitable process/method and/or means. For example, in some embodiments comprising the oxidizing agent (such as ferric sulfate), the acidic mixture can be prepared by a process comprising adjusting the pH of an aqueous solution comprising the desired amount of the oxidizing agent (such as ferric sulphate) with a suitable acid (such as sulfuric acid) to a suitable value (such as a pH of about 2) to obtain an acidic aqueous solution comprising the oxidizing agent, then adding the desired amount of the reagent having the thiocarbonyl functional group (or dimer thereof) to obtain the acidic mixture. In some embodiments, for example, wherein the carbonaceous matter is not combined e.g., agglomerated with the material (such as the copper sulfide ore), the preparation of the acidic mixture can further comprise dispersing the desired amount of the carbonaceous matter in the acidic aqueous solution comprising the oxidizing agent to obtain the acidic mixture. In some embodiments, the dispersing is prior to the addition of the reagent having the thiocarbonyl functional group (or dimer thereof). In some embodiments, the dispersing is subsequent to the addition of the reagent having the thiocarbonyl functional group (or dimer thereof).

In some embodiments, the process/method further comprises recovering the base metal. For example, the base metal can be recovered from the pregnant leach solution in embodiments wherein the contacting of the material with the carbonaceous matter and the reagent having the thiocarbonyl functional group produces a pregnant leach solution comprising the base metal. In embodiments wherein the process comprises recovering the base metal (e.g., from the pregnant leach solution), the process for recovering the base metal can be any suitable process/method, the selection of which can be made by the person skilled in the art. For example, where the material comprises chalcopyrite, in the presence of the carbonaceous matter and the reagent having the thiocarbonyl functional group as catalysts, the following reaction is facilitated:

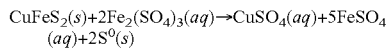

$CuFeS_2(s)+2Fe_2(SO_4)_3(aq) \rightarrow CuSO_4(aq)+5FeSO_4(aq)+2S^0(s)$

After the chalcopyrite is oxidized, the dissolved copper can be recovered (e.g., from the pregnant leach solution). In an embodiment of the present disclosure, the recovering of the base metal (such as copper) comprises solvent extraction and electrowinning. In an embodiment, prior to the solvent extraction, the process further comprises a solid-liquid separation. In an embodiment, prior to the recovering, the process further comprises a solid-liquid separation.

In another embodiment, the process further comprises recovering the reagent having the thiocarbonyl functional group. For example, the reagent having the thiocarbonyl functional group can be recovered from the pregnant leach solution in embodiments wherein the contacting of the material with the carbonaceous matter and the reagent having the thiocarbonyl functional group produces a pregnant leach solution comprising the base metal. For example, in some embodiments, iron and copper ions are present (e.g., in the pregnant leach solution). A person skilled in the art will appreciate that reagents having thiocarbonyl functional groups can form various stable complexes with copper ions. Extractants commonly used for solvent extraction of copper ions such as hydroxyoximes and aldoximes, are strong complexing agents for the copper ions. The extractants can change the equilibrium between copper ions and reagents having thiocarbonyl carbonyl groups which are acting as a ligand, releasing the reagent having the thiocarbonyl functional group from the copper complex. As the free reagent having the thiocarbonyl functional group enters the raffinate solution, it can be recirculated for further contacting with the material. Accordingly, in an embodiment, the solvent extraction comprises contacting the base metal cations (e.g., in the pregnant leach solution) with an extractant for base metal cations in the presence of an organic solvent. The skilled person will be able to select a suitable organic solvent or combination thereof depending on the base metal cation to be extracted. In an embodiment, the organic solvent is an aliphatic solvent, an aromatic solvent or combination thereof. In another embodiment, the organic solvent comprises kerosene, alkyl aromatics, cyclo-paraffins or combinations thereof. The skilled person will also be able to select an appropriate extractant for the base metal cation. In an embodiment, the extractant for the base metal cation is an aldoxime, a ketoxime or combinations thereof. In another embodiment, the contacting is further carried out in the presence of an ester modifier, an alkylphenol modifier or combinations thereof. During the solvent extraction, base metal cations are de-complexed from the reagent having the thiocarbonyl functional group, thus liberating the reagent, and allowing the base metal cations to be extracted (e.g., from the pregnant leach solution) into the organic solvent. The free reagent having the thiocarbonyl functional group remains in the aqueous phase. In some embodiments, the retention of the free reagent having the thiocarbonyl functional group in the aqueous phase during solvent extraction to produce the raffinate comprising the free reagent is accomplished with a halide e.g., chloride, bromide, or iodide, present (e.g., in the pregnant leach solution). Separation of the organic solvent from the aqueous phase results in a base metal cation-depleted raffinate comprising the free reagent having the thiocarbonyl functional group, and a base metal cation-enriched organic phase comprising the organic solvent and base metal cations. The base metal cation-enriched solution can then be processed (e.g., by a process comprising electrowinning) to recover the base metal. The raffinate can optionally be recirculated for use in the process. Accordingly, in some embodiments, the process optionally further comprises recycling the recovered reagent having the thiocarbonyl functional group for use in the contacting of a further portion of the material. In some embodiments, additional reagent having a thiocarbonyl functional group (or dimer thereof) is added to reach a desired concentration prior to the contacting with the material. In some embodiments, a reducing agent is added prior to the contacting with the material. In an embodiment, the reducing agent is $H_2S$, NaSH or zinc (Zn). In an embodiment, the reducing agent is added in an amount that results in a ratio of reagent having a thiocarbonyl functional group (e.g., thiourea):corresponding dimer (e.g., FDS) in a range of about 0.5:1 to about 9:1.

The contacting of the material with the carbonaceous matter and the reagent having the thiocarbonyl functional group is carried out/operated under any suitable temperature and pressure conditions. For example, the contacting can be carried out/operated at a temperature greater than 0° C. to about 80° C. However, the contacting in the processes of the present disclosure is advantageously carried out/operated at ambient temperature (e.g., from about 5° C. to about 40° C. or about 15° C. to about 25° C.) and pressure (e.g., about 1 atm). It will be appreciated by a person skilled in the art that ambient pressure may vary, for example, depending on the altitude.

In an embodiment, the process is a batch process. In another embodiment, the process comprises a batch process. In an embodiment, the process is a continuous process. In another embodiment, the process comprises a continuous process.

The present disclosure also includes a use of carbonaceous matter and a reagent having a thiocarbonyl functional group in a process for extracting a base metal from a material comprising the base metal. In an embodiment, the process is any process for extracting a base metal from a material comprising the base metal as described herein.

The present disclosure also includes a use of carbonaceous matter and a reagent comprising a thiocarbonyl functional group in a method for extracting a base metal from a material comprising the base metal. In an embodiment, the method is a method for extracting a base metal from a material comprising the base metal as described herein.

The present disclosure also includes a use of carbonaceous matter and a reagent having a thiocarbonyl functional group in a process for extracting (e.g., leaching) and optionally recovering a base metal from a material comprising the base metal. In an embodiment, the process comprises recovering the base metal. Accordingly, the present disclosure also includes a use of carbonaceous matter and a reagent having a thiocarbonyl functional group in a process for extracting (e.g., leaching) and recovering a base metal from a material comprising the base metal. In another embodiment, the use does not comprise recovering the base metal. Accordingly, the present disclosure also includes a use of carbonaceous matter and a reagent having a thiocarbonyl functional group in a process for extracting (e.g., leaching) a base metal from a material comprising the base metal. In an embodiment, the process is any process for extracting (e.g., leaching) and optionally recovering a base metal from a material comprising the base metal as described herein.

The present disclosure also includes a use of carbonaceous matter and a reagent having a thiocarbonyl functional group for extracting a base metal from a material comprising the base metal, wherein the material is contacted under acidic conditions with the carbonaceous matter and the reagent having the thiocarbonyl functional group. The present disclosure also includes a use of carbonaceous matter and a reagent comprising a thiocarbonyl functional group for extracting a base metal from a material comprising the base metal, wherein the material is contacted under acidic conditions with the carbonaceous matter and the reagent comprising the thiocarbonyl functional group.

The present disclosure also includes a use of carbonaceous matter and a reagent having a thiocarbonyl functional group for extracting (e.g., leaching) and optionally recovering a base metal from a material comprising the base metal, wherein the material is contacted under acidic conditions with the carbonaceous matter and the reagent having the thiocarbonyl functional group. In an embodiment, the use comprises recovering the base metal. Accordingly, the present disclosure also includes a use of carbonaceous matter and a reagent having a thiocarbonyl functional group for extracting (e.g., leaching) and recovering a base metal from a material comprising the base metal, wherein the material is contacted under acidic conditions with the carbonaceous matter and the reagent having the thiocarbonyl functional group. The present disclosure also includes a use of carbonaceous matter and a reagent comprising a thiocarbonyl group for extracting at least one base metal from a material comprising the at least one base metal, wherein the material is contacted under acidic conditions with the reagent comprising the thiocarbonyl functional group and the carbonaceous matter. In another embodiment, the use does not comprise recovering the base metal. Accordingly, the present disclosure also includes a use of carbonaceous matter and a reagent having a thiocarbonyl functional group for extracting (e.g., leaching) a base metal from a material comprising the base metal, wherein the material is contacted under acidic conditions with the carbonaceous matter and the reagent having the thiocarbonyl functional group.

The material is contacted with the carbonaceous matter and the reagent having the thiocarbonyl functional group by any suitable process/method.

In an embodiment of the present disclosure, the material is contacted with the carbonaceous matter and the reagent having the thiocarbonyl functional group by a process comprising: combining the carbonaceous matter with the material; and contacting the combined carbonaceous matter and material with an acidic mixture comprising the reagent having the thiocarbonyl functional group. In an embodiment, the carbonaceous matter is agglomerated with the material. Processes/methods for agglomerating are well known in the art and a suitable process/method for agglomeration of the carbonaceous matter and the material can be selected by the skilled person.

In an alternative embodiment of the present disclosure, the material is contacted with the carbonaceous matter and the reagent having the thiocarbonyl functional group by a process comprising: contacting the material with an acidic mixture comprising the carbonaceous matter and the reagent having the thiocarbonyl functional group.

In some embodiments, the acidic mixture further comprises an oxidizing agent. The oxidizing agent can be any suitable oxidizing agent or combination thereof, the selection of which can be made by a person skilled in the art. In an embodiment, the oxidizing agent comprises oxygen, a source of $Fe^{3+}$ ions or combinations thereof. In another embodiment, the oxidizing agent comprises a source of $Fe^{3+}$ (ferric) ions. For example, the oxidizing agent can comprise a water-soluble salt such as ferric sulfate (also known as iron (III) sulfate or $Fe_2(SO_4)_3$) that can act as a direct source of $Fe^{3+}$ ions and/or a water-soluble salt such as ferrous sulfate (also known as iron (II) sulfate or $FeSO_4$) that acts as a direct source of $Fe^{2+}$ ions that can, for example, be oxidized into $Fe^{3+}$ ions e.g., by iron-oxidizing bacteria. In another embodiment, the oxidizing agent comprises ferric sulfate. In another embodiment, the source of ferric ions comprises ferric ions generated at least in part by iron-oxidizing bacteria. In an embodiment, the acidic mixture comprises a ferric solution. In another embodiment, the acidic mixture comprises a ferric sulfate solution. In a further embodiment, the acidic mixture comprises a ferric media. In another embodiment, the acidic mixture comprises a ferrous sulfate solution. In another embodiment, the ferrous sulfate solution provides a source of $Fe^{2+}$ ions that are oxidized to $Fe^{3+}$ ions by iron-oxidizing bacteria. The concentration of the oxidizing agent such as ferric sulfate in the acidic mixture can be any suitable concentration. In an embodiment, prior to the material being contacted with the carbonaceous matter and the reagent having the thiocarbonyl functional group, the oxidizing agent e.g., ferric sulfate is present in the acidic mixture at a concentration of less than 10 g/L of $Fe^{3+}$. In another embodiment, prior to the material being contacted with the carbonaceous matter and the reagent having the thiocarbonyl functional group, the oxidizing agent e.g., ferric sulfate is present in the acidic mixture at a concentration of from about 0.5 g/L to about 40 g/L, about 1.5 g/L to about 3 g/L or about 2 g/L to about 2.5 g/L of $Fe^{3+}$.

In some embodiments, the material comprising the base metal (e.g., a base metal sulfide ore) further comprises iron-oxidizing bacteria. In some embodiments, the acidic mixture further comprises iron-oxidizing bacteria. The iron-oxidizing bacteria can be any suitable iron-oxidizing bacteria or combination (consortium) thereof, the selection of which can be made by a person skilled in the art. In an embodiment, the iron-oxidizing bacteria comprise *Acidothiobacilos ferrooxidans*.

The material comprising the base metal is any suitable material comprising a base metal or combination thereof extractable by the processes/methods of the present disclosure. For example, in an embodiment, the material comprising the base metal is a material comprising a base metal sulfide, electronic waste (e.g., waste printed circuit boards) comprising a base metal, or any other suitable material comprising a base metal or combinations thereof. In another embodiment, the material comprising the base metal comprises waste printed circuit boards, batteries or any other suitable base metal-containing waste or other materials or combinations thereof. In an embodiment, the material comprising the base metal is a material comprising a base metal sulfide.

Suitable base metals may include but are not limited to copper, nickel, iron, aluminum, lead, zinc, tin, tungsten (also sometimes referred to as wolfram), molybdenum, tantalum, magnesium, cobalt, bismuth, cadmium, titanium, zirconium, antimony, manganese, beryllium, chromium, germanium, vanadium, gallium, hafnium, indium, niobium (also sometimes referred to as columbium), rhenium, thallium and combinations thereof. In an embodiment, the base metal comprises copper, nickel, zinc or combinations thereof. In another embodiment, the base metal comprises copper. In an embodiment, the material comprises an ore. In another embodiment, the material comprises a concentrate. In an embodiment, the material comprises a copper sulfide ore. In another embodiment, the copper sulfide ore is a primary copper sulfide (e.g., chalcopyrite, bornite, enargite or combinations thereof), a secondary copper sulfide (e.g., covellite, chalcocite or combinations thereof) or combinations thereof. In an embodiment, the copper sulfide ore comprises a primary copper sulfide. In another embodiment, the copper sulfide ore comprises a secondary copper sulfide. In a further embodiment, the copper sulfide ore comprises a combination of a primary copper sulfide and a secondary copper sulfide. In another embodiment, the copper sulfide ore comprises chalcopyrite, bornite, enargite, covellite, chalcocite, a copper sulfide of the formula $Cu_xS_y$, wherein the x:y ratio is between 1 and 2 or combinations thereof. In an embodiment, the copper sulfide of the formula $Cu_xS_y$, wherein the x:y ratio is between 1 and 2 is chalcocite, djurleite, digenite or combinations thereof. In another embodiment, the copper sulfide ore comprises chalcopyrite. Base metal sulfide ores other than copper sulfide ores are well known to the person skilled in the art. In an embodiment, the material comprises a nickel sulfide ore. In another embodiment, the nickel sulfide ore comprises pentlandite, violarite or combinations thereof.

The acidic conditions are any suitable acidic conditions, the selection of which can be made by a person skilled in the art. In some embodiments, sulfuric acid is added to obtain the acidic conditions. In an embodiment, prior to the contact, the pH of the acidic mixture is in a range of from about 0.5 to about 4, about 1 to about 3, or about 1.5 to about 2.5. In another embodiment, the pH of the acidic mixture is about 2.

The reagent having the thiocarbonyl functional group can be any suitable reagent having a thiocarbonyl functional group. For example, suitable reagents having a thiocarbonyl functional group may feature a C=S functional group having a sulfur bearing a partial negative charge, bearing a negative electrostatic potential surface and having an empty $\pi^*$-antibonding orbital as its lowest unoccupied molecular orbital (LUMO), provided that the reagent having the thiocarbonyl functional group is at least partially soluble in water and preferably does not significantly complex with the base metal and/or (if present) the oxidizing agent to form insoluble precipitates. Certain reagents having a thiocarbonyl functional group are capable of oxidizing to form the corresponding dimer. For example, thiourea, in the presence of a suitable oxidant such as ferric sulfate is capable of oxidizing to form the dimer formamidine disulfide (FDS). An equilibrium exists between FDS and thiourea in a ferric sulfate solution such that, for example, an acidic mixture prepared with a dimer of a reagent having a thiocarbonyl functional group (e.g., FDS) will provide the reagent having the thiocarbonyl functional group (e.g., thiourea) for contacting the material. Accordingly, in an embodiment, the reagent having the thiocarbonyl functional group is added in the form of the corresponding dimer. The present disclosure also includes a use of carbonaceous matter and FDS for extracting at least one base metal from a material comprising the at least one base metal, wherein the material is contacted under acidic conditions with the FDS and the carbonaceous matter. In an alternative embodiment of the present disclosure, the reagent having the thiocarbonyl functional group is added in monomeric form (i.e.in the form of the reagent having the thiocarbonyl functional group).

In an embodiment, the reagent having the thiocarbonyl functional group is or comprises N-N' substituted thioureas; 2,5-dithiobiurea; dithiobiuret; thiosemicarbazide purum; thiosemicarbazide; thioacetamide; 2-methyl-3-thiosemicarbazide; 4-methyl-3-thiosemicarbazide; vinylene trithiocarbonate purum; vinylene trithiocarbonate; 2-cyanothioacetamide; ethylene trithiocarbonate; potassium ethyl xanthogenate; dimethylthiocarbamoyl chloride; dimethyldithiocarbamate; dimethyl trithiocarbonate; N,N-dimethylthioformamide; 4,4-dimethyl-3-thiosemicarbazide; 4-ethyl-3-thiosemicarbazide; O-isopropylxanthic acid; ethyl thiooxamate; ethyl dithioacetate; pyrazine-2-thiocarboxamide; diethylthiocarbamoyl chloride; diethyldithiocarbamate; tetramethylthiuram monosulfide; tetramethylthiuram disulfide; pentafluorophenyl chlorothionoformate; 4-fluorophenyl chlorothionoformate; O-phenyl chlorothionoformate; phenyl chlorodithioformate; 3,4-difluorothiobenzamide; 2-bromothiobenzamide; 3-bromothiobenzamide; 4-bromothiobenzamide; 4-chlorothiobenzamide; 4-fluorothiobenzamide; thiobenzoic acid; thiobenzamide; 4-phenylthiosemicarbazide; O-(p-tolyl) chlorothionoformate; 4-bromo-2-methylthiobenzamide; 3-methoxythiobenzamide; 4-methoxythiobenzamide; 4-methylbenzenethioamide; thioacetanilide; salicylaldehyde thiosemicarbazone; indole-3-thiocarboxamide; S-(thiobenzoyl)thioglycolic acid; 3-(acetoxy)thiobenzamide; 4-(acetoxy)thiobenzamide; methyl N'-[(e)-(4-chlorophenyl)methylidene]hydrazonothiocarbamate; 3-ethoxythiobenzamide; 4-ethylbenzene-1-thiocarboxamide; tert-butyl 3-[methylsulfonyl)oxy]-1-azetanecarboxylate; diethyldithiocarbamic acid; 2-(phenylcarbonothioylthio)-propanoic acid; 2-hydroxybenzaldehyde N-ethylthiosemicarbazone; (1R,4R)-1,7,7-trimethylbicyclo[2.2.1]heptane-2-thione; tetraethylthiuram disulfide; 4'-hydroxybiphenyl-4-thiocarboxamide; 4-biphenylthioamide; dithizone; 4'-methylbiphenyl-4-thiocarboxamide; tetraisopropylthiuram disulfide; anthracene-9-thiocarboxamide; phenanthrene-9-thiocarboxamide; sodium dibenzyldithiocarbamate; 4,4'-bis(dimethylamino)thiobenzophenone; or combinations thereof. In an embodiment, the reagent having the thiocarbonyl functional group comprises thiourea, ethylene thiourea, thioacetamide, sodium dimethyldithiocarbamate, trithiocarbonate, thiosemicarbazide or combinations thereof. In another embodiment, the reagent having the thiocarbonyl functional group comprises thiourea. In an embodiment, the reagent having the thiocarbonyl functional group is not thiourea.

The concentration of the reagent having the thiocarbonyl functional group in the acidic mixture can be any suitable concentration. In embodiments wherein the reagent having the thiocarbonyl functional group is added in the form of the corresponding dimer, the concentrations specified herein for the reagent having the thiocarbonyl functional group refers to a concentration calculated as if all of the dimer was dissociated into the reagent having the thiocarbonyl functional group. In an embodiment, prior to the material being contacted with the carbonaceous matter and the reagent having the thiocarbonyl functional group, the reagent having the thiocarbonyl functional group is present in the acidic mixture at a concentration of about 0.002 mM or greater, about 0.02 mM or greater, about 0.1 mM or greater, about 0.2 mM or greater, about 0.25 mM or greater, about 0.3 mM or greater, about 0.4 mM or greater, about 0.5 mM or greater, about 0.6 mM or greater, about 0.7 mM or greater, about 0.8 mM or greater, about 0.9 mM or greater, about 1.0 mM or greater, about 1.5 mM or greater, about 2 mM or greater, about 2.5 mM or greater, about 3 mM or greater, about 4 mM or greater, about 5 mM or greater, about 10 mM or greater, about 20 mM or greater, about 30 mM or greater, or about 60 mM or greater. In an embodiment, prior to the material being contacted with the carbonaceous matter and the reagent having the thiocarbonyl functional group, the reagent having the thiocarbonyl functional group is present in the acidic mixture at a concentration of about 100 mM or lower, about 60 mM or lower or about 30 mM or lower. In another embodiment, prior to the material being contacted with the carbonaceous matter and the reagent having the thiocarbonyl functional group, the reagent having the thiocarbonyl functional group is present in the acidic mixture at a concentration of about 20 mM or lower. In some embodiments, a lower concentration of the reagent having the thiocarbonyl functional group is used. Accordingly, in another embodiment of the present disclosure, prior to the material being contacted with the carbonaceous matter and the reagent having the thiocarbonyl functional group, the reagent having the thiocarbonyl functional group is present in the acidic mixture at a concentration of about 10 mM or lower, about 5 mM or lower, about 4 mM or lower, about 3 mM or lower, about 2.5 mM or lower, about 2 mM or lower, about 1.5 mM or lower, about 1.0 mM or lower, about 0.9 mM or lower, about 0.8 mM or lower, about 0.75 mM or lower, about 0.7 mM or lower, about 0.6 mM or lower, about 0.5 mM or lower, about 0.4 mM or lower, about 0.3 mM or lower, about 0.2 mM or lower, about 0.02 mM or lower, or about 0.002 mM or lower. It will be appreciated by a person skilled in the art that such embodiments can be interchanged in any suitable manner. For example, in another embodiment of the present disclosure, prior to the material being contacted with the carbonaceous matter and the reagent having the thiocarbonyl functional group, the reagent having the thiocarbonyl functional group is present in the acidic mixture at a concentration of from about 0.002 mM to about 100 mM, about 0.2 mM to about 100 mM, about 0.2 mM to about 20 mM, about 0.1 mM to about 10 mM, about 0.2 mM to about 10 mM, about 0.2 mM to about 5 mM, about 0.2 mM to about 4 mM, about 0.2 mM to about 3 mM, about 0.25 mM to about 2.5 mM, about 0.2 mM to about 2 mM, about 0.2 mM to about 1.5 mM, about 0.2 mM to about 1.0 mM, about 0.2 mM to about 0.5 mM, about 0.25 mM to about 0.75 mM, about 1.5 mM to about 2.5 mM, about 0.5 mM or about 2 mM.

The concentration of the FDS in the acidic conditions can be any suitable concentration. The concentrations specified hereinbelow for FDS refer to a concentration calculated as if no FDS was dissociated into thiourea. In an embodiment, the FDS is comprised in the acidic conditions at a concentration of about 0.001 mM or greater, about 0.01 mM or greater, about 0.05 mM or greater, about 0.1 mM or greater, about 0.125 mM or greater, about 0.15 mM or greater, about 0.2 mM or greater, about 0.25 mM or greater, about 0.3 mM or greater, about 0.35 mM or greater, about 0.4 mM or greater, about 0.45 mM or greater, about 0.5 mM or greater, about 0.75 mM or greater, about 1 mM or greater, about 1.25 mM or greater, about 1.5 mM or greater, about 2 mM or greater, about 2.5 mM or greater, about 5 mM or greater, about 10 mM or greater, about 15 mM or greater, or about 30 mM or greater. In an embodiment, the FDS is comprised in the acidic conditions at a concentration of about 50 mM or lower, about 30 mM or lower, or about 15 mM or lower. In another embodiment, the FDS is comprised in the acidic conditions at a concentration of about 10 mM or lower. In some embodiments, a lower concentration of the FDS is used. Accordingly, in another embodiment of the present disclosure, the FDS is comprised in the acidic conditions at a concentration of about 5 mM or lower, about 2.5 mM or lower, about 2 mM or lower, about 1.5 mM or lower, about 1.25 mM or lower, about 1 mM or lower, about 0.75 mM or lower, about 0.5 mM or lower, about 0.45 mM or lower, about 0.4 mM or lower, about 0.375 mM or lower, about 0.35 mM or lower, about 0.3 mM or lower, about 0.25 mM or lower, about 0.2 mM or lower, about 0.15 mM or lower, about 0.1 mM or lower, about 0.01 mM or lower, or about 0.001 mM or lower. It will be appreciated by a person skilled in the art that such embodiments can be interchanged in any suitable manner. For example, in another embodiment, the FDS is comprised in the acidic conditions at a concentration in a range of about 0.001 mM to about 50 mM, about 0.001 mM to about 30 mM, about 0.001 mM to about 25 mM, about 0.001 mM to about 15 mM, about 0.001 mM to about 10 mM, about 0.001 mM to about 5 mM, about 0.001 mM to about 2.5 mM, about 0.001 mM to about 1 mM, about 0.001 mM to about 0.5 mM, about 0.001 mM to about 0.25 mM, about 0.001 mM to about 0.1 mM, about 0.001 mM to about 0.01 mM, about 0.01 mM to about 50 mM, about 0.01 mM to about 30 mM, about 0.01 mM to about 25 mM, about 0.01 mM to about 15 mM, about 0.01 mM to about 10 mM, about 0.01 mM to about 5 mM, about 0.01 mM to about 2.5 mM, about 0.01 mM to about 1 mM, about 0.01 mM to about 0.5 mM, about 0.01 mM to about 0.25 mM, about 0.01 mM to about 0.1 mM, about 0.1 mM to about 50 mM, about 0.1 mM to about 30 mM, about 0.1 mM to about 25 mM, about 0.1 mM to about 15 mM, about 0.1 mM to about 10 mM, about 0.1 mM to about 5 mM, about 0.1 mM to about 2.5 mM, about 0.1 mM to about 1 mM, about 0.1 mM to about 0.5 mM, about 0.1 mM to about 0.25 mM, about 1 mM to about 50 mM, about 1 mM to about 30 mM, about 1 mM to about 25 mM, about 1 mM to about 15 mM, about 1 mM to about 10 mM, about 1 mM to about 5 mM, about 5 mM to about 50 mM, about 5 mM to about 30 mM, about 5 mM to about 25 mM, about 5 mM to about 15 mM, about 5 mM to about 10 mM, about 15 mM to about 50 mM, about 15 mM to about 30 mM, about 15 mM to about 25 mM, about 25 mM to about 50 mM, or about 30 mM to about 50 mM.

The carbonaceous matter can be any suitable carbonaceous matter. For example, suitable carbonaceous matter is at least substantially, optionally fully insoluble and at least substantially, optionally fully a solid under the leaching conditions used in the uses of the present disclosure and is optionally in the form of particles and/or chunks. In an embodiment, the carbonaceous matter comprises carbon black, activated carbon, graphite, carbon anode scrap, charcoal, coal, solid organic carbon, carbon naturally present in the material comprising the base metal (e.g., an ore) or combinations thereof. In another embodiment, the carbonaceous matter comprises carbon black particles. The dosage and particle size of the carbonaceous matter can be any suitable dosage and particle size. For example, it will be appreciated by a person skilled in the art that in embodiments wherein iron-oxidizing bacteria are present, the dosage is compatible with the presence of such bacteria and is desirably selected such that no significant difference is observed in the growth and/or iron oxidation ability of the bacteria. In an embodiment of the present disclosure, the dosage of the carbonaceous matter is about 1 g or lower of carbonaceous matter per gram of ore. Advantageously, a lower dosage and finer particle size of the carbonaceous matter is used in order to maximize the contact between the material comprising the base metal sulfide (e.g., the chalcopyrite) and the carbonaceous matter.

Accordingly, in another embodiment, the dosage of the carbonaceous matter is from about 0.001 g to about 0.25 g, about 0.01 g to about 0.1 g or about 0.05 g to about 0.1 g per gram of the base metal sulfide (e.g., chalcopyrite) in the material comprising the base metal sulfide. In another embodiment, the particle size of the carbonaceous matter is less than 500, 100 or 30 microns.

The contacting of the material with the carbonaceous matter and the reagent having the thiocarbonyl functional group is carried out/operated under any suitable temperature and pressure conditions. For example, the contacting can be carried out/operated at a temperature greater than 0° C. to about 80° C. However, the contacting in the uses of the present disclosure is advantageously carried out at ambient temperature (e.g., from about 5° C. to about 40° C. or about 15° C. to about 25° C.) and pressure (e.g., about 1 atm).

The following non-limiting examples are illustrative of the present disclosure:

EXAMPLES

The general leaching conditions used in the examples were 2.2 g/L $Fe^{3+}$ obtained from ferric sulphate ($Fe_2(SO_4)_3$) adjusted by sulfuric acid to a pH of about 2 for all experiments. The specified amounts of pulverized chalcopyrite ($CuFeS_2$), carbon black and reagents having thiocarbonyl functional groups were then added to the leaching mixture. All chalcopyrite samples used in the examples came from natural minerals containing 33.4% of copper according to inductively coupled plasma-atomic emission spectroscopy (ICP-AES) analysis. No pretreatment was performed other than pulverization. *Acidothiobacilos ferrooxidans*, an iron-oxidizing bacteria commonly used in acidic heap leaching were incorporated to the leaching environment. Bacteria were cultured from Modified Kelly Medium (MKM; containing 0.4 g/L ammonium sulfate, 0.4 g/L magnesium sulfate and 0.04 g/L potassium dihydrogen phosphate). The same bacterial culture was used in all bioleaching tests. 1 ml/L of the culture was added to each bioreactor before the test and no further maintenance was performed. The minerals were agitated in bioreactors at about 500 rpm at ambient temperature and atmosphere.

Example 1

Thiourea was used as the reagent having the thiocarbonyl functional group in this example. In each test, 1 gram of pulverized chalcopyrite ($CuFeS_2$) mineral and 1 L of lixiviant was used. The control test ("C") was carried out using the general leaching conditions described above. A thiourea control test ("T") was run under the same conditions as the control except for the addition of 2 mM thiourea at the beginning of the test. A carbon control test ("C+C") was run under the same conditions as the control except for the addition of 1 g/L of carbon black having a particle size of less than 30 microns. The thiourea and carbon test ("T+C") was run under the same conditions as the control test except for the addition of 2 mM of thiourea and 1 g/L of carbon black having a particle size of less than 30 microns.

It was observed that addition of thiourea significantly enhanced the leaching in comparison to the control (see FIG. 1; percent copper extraction for test "T" in comparison to test "C"). The addition of carbon black was also observed to enhance leaching in comparison to control (FIG. 1; "C+C" had a higher extraction rate than "C"). However, both the "C" and "C+C" tests were terminated at 312 hours due to their low extraction rate. By comparing the results obtained at hour 312, it can be seen that adding carbon black only improved the extraction by 5.97% (from 6.34% to 12.31%) in comparison to control whereas adding carbon black to the thiourea catalyzed ferric leaching system surprisingly increased the extraction by 14.2% (from 46.78% to 60.98%). While not wishing to be limited by theory, these results suggest that the use of carbon black with the thiourea created a synergistic effect in catalyzed chalcopyrite leaching.

Example 2

The tests in this example were carried out in a similar fashion as Example 1 except for the concentrations described herein. In all tests carried out for Example 2, 5 g of pulverized chalcopyrite mineral was used. The control test ("C") was carried out using the general leaching conditions described above. The thiourea control test ("T") was run under the same conditions as the control except for the addition of 0.5 mM thiourea at the beginning of the test. The carbon control test ("C+C") was run under the same conditions as the control except for the addition of 0.1 g/L of carbon black. The thiourea and carbon test ("T+C") was run under the same conditions as the control test except for the addition of 0.5 mM of thiourea and 0.1 g/L of carbon black.

Figure 2:
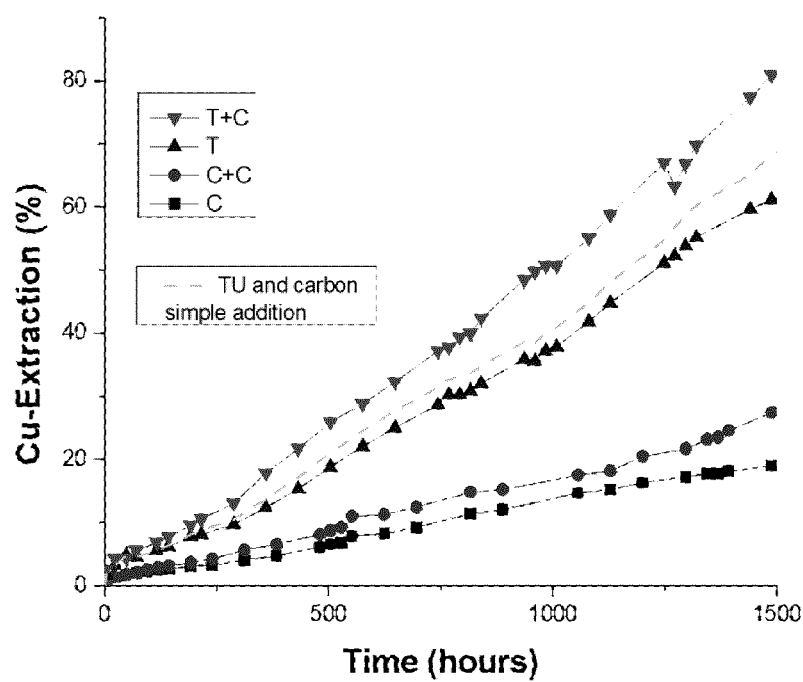
FIG. 2 is a graph showing the synergistic effect of adding thiourea (0.5 mM) and carbon black (0.1 g/L) in a method for copper extraction from natural chalcopyrite ore according to an embodiment of the present disclosure (T+C) in comparison to a control method without either thiourea or carbon black (C), a control method with carbon black (C+C) and a control method with thiourea (T) according to comparative examples of the present disclosure.

By using thiourea (TU) and carbon black together in the "T+C" test, the two compounds created a significant synergistic effect compared with simple addition of each individual effect represented by the dashed curve in FIG. 2. By comparing the results obtained at hour 1488, it is seen that adding carbon black alone to the control condition only improved the extraction by 8.42% (from 19.01 to 27.43%) and adding thiourea alone improved the extraction by 42.18% (from 19.01 to 61.19%). The simple addition of the two individual effects gives an improvement of 50.60%. In comparison, when both reagents were present, the copper extraction was increased by 61.89% (from 19.01 to 80.90%). The results suggest that carbon black created a strong synergistic effect with thiourea in catalyzed chalcopyrite leaching. The results in Example 2 are therefore consistent with the results from Example 1.

Example 3

A polished chalcopyrite mineral specimen was used in these leaching tests to produce a leached surface for analysis. Ethylene thiourea, another common reagent having a thiocarbonyl functional group, was used in this example. One piece of mineral was first polished using 1200 grid sandpaper and then cut into three pieces. The first piece was suspended in a reactor containing lixiviant solution with pH=1.7, [$Fe^{3+}$]=2.2 g/L and agitation rate=500 rpm ("Control"). The second piece was suspended in a reactor with the same solution as the control plus 2 mM of ethylene thiourea ("ETU"). The third piece was suspended in a reactor with the same solution as the control plus 2 mM of ethylene thiourea and 1 g/L of carbon black having a particle size of less than 30 microns ("ETU+Carbon"). All three reactors were kept at room temperature for 10 days. Samples were rinsed with deionized water and toluene before imaging.

Figure 3:
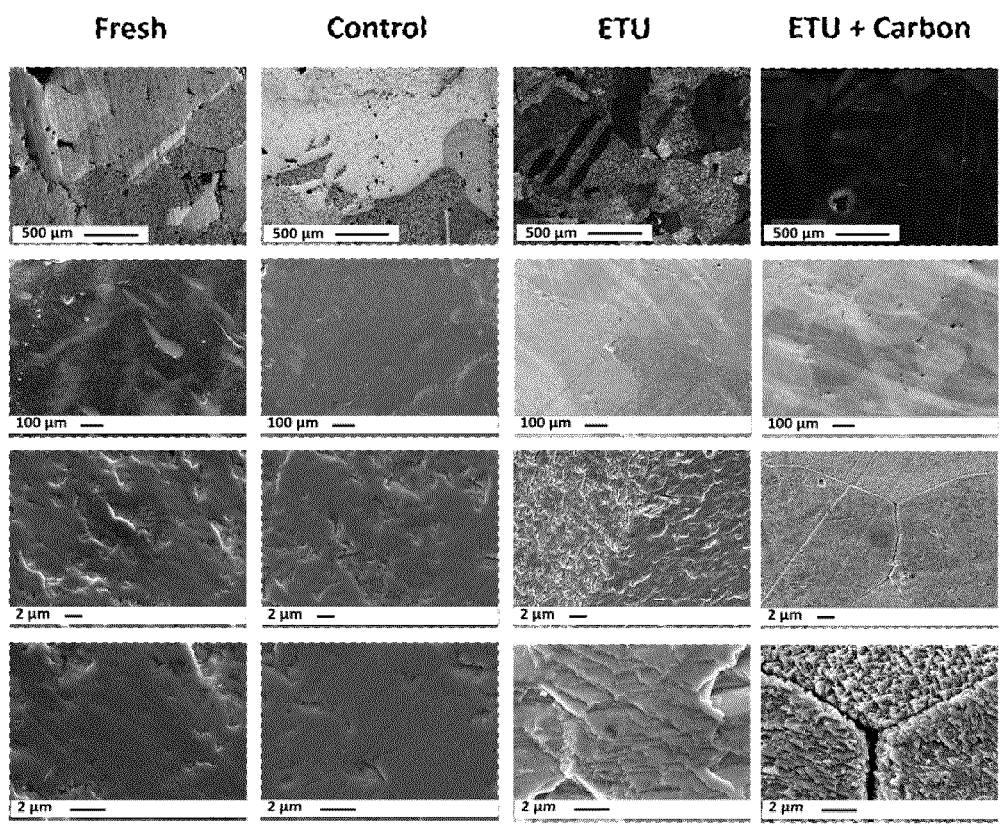
FIG. 3 shows the synergistic effect of adding ethylene thiourea (2 mM) and carbon black (1 g/L) on a chalcopyrite mineral surface after 10 days of immersion tests according to an embodiment of the present disclosure (images in far right-hand column) in comparison to a fresh chalcopyrite mineral surface (images in far left-hand column); a control method without either thiourea or carbon black according to a comparative example of the present disclosure (images in second column from the left); and a control method with ethylene thiourea according to a comparative example of the present disclosure (images in the second column from the right). Scale bars in each row from top to bottom show: 500 microns, 100 microns, 2 microns and 2 microns.

FIG. 3 shows the exemplary optical and scanning electron microscopy (SEM) images of the Control, ETU and ETU+Carbon samples as well as the freshly polished sample before any contact with the leaching mixture. It can be clearly observed that the addition of ethylene thiourea enhanced the surface corrosion of the chalcopyrite mineral compared to the control. However, addition of carbon black together with the ethylene thiourea further enhanced the corrosion behavior, in line with the synergistic effect observed in Examples 1 and 2.

While the disclosure has been described with reference to what are presently considered to be the preferred examples, it is to be understood that the disclosure is not limited to the disclosed examples. To the contrary, the present disclosure is intended to cover various modifications and equivalent arrangements included within the spirit and scope of the appended claims.

All publications, patents and patent applications are herein incorporated by reference in their entirety to the same extent as if each individual publication, patent or patent application was specifically and individually indicated to be incorporated by reference in its entirety. Where a term in the present application is found to be defined differently in a document incorporated herein by reference, the definition provided herein is to serve as the definition for the term.

What is claimed is:

1. A method for extracting a base metal from a material comprising the base metal, the method comprising contacting the material under acidic conditions with carbonaceous matter and a reagent comprising a thiocarbonyl functional group.

2. The method of claim 1 wherein the material is contacted with the carbonaceous matter and the reagent comprising the thiocarbonyl functional group by a method comprising:
combining the carbonaceous matter with the material; and
contacting the combined carbonaceous matter and material with an acidic mixture comprising the reagent comprising the thiocarbonyl functional group.

3. The method of claim 1 wherein the carbonaceous matter is agglomerated with the material.

4. The method of claim 2 wherein the acidic mixture further comprises an oxidizing agent.

5. The method of claim 4 wherein the oxidizing agent comprises ferric sulfate.

6. The method of claim 1 wherein the material further comprises iron-oxidizing bacteria.

7. The method of claim 1 wherein the acidic mixture further comprises iron-oxidizing bacteria.

8. The method of claim 1 wherein the material comprises a base metal sulfide.

9. The method of claim 1 wherein the material comprises an ore.

10. The method of claim 1 wherein the base metal comprises copper.

11. The method of claim 10 wherein the material comprises a copper sulfide ore.

12. The method of claim 11 wherein the copper sulfide ore comprises chalcopyrite.

13. The method of claim 1 wherein the method comprises adding sulfuric acid to obtain the acidic conditions.

14. The method of claim 2 wherein prior to the contact, the pH of the acidic mixture is in a range of from about 1.5 to about 2.5.

15. The method of claim 1 wherein the reagent comprising the thiocarbonyl functional group is added to the method in monomeric form.

16. The method of claim 1 wherein the reagent comprising the thiocarbonyl functional group is added to the method in the form of the corresponding dimer.

17. The method of claim 1 wherein the reagent comprising the thiocarbonyl functional group comprises thiourea.

18. The method of claim 1 wherein the carbonaceous matter comprises carbon black particles.

19. The method of claim 1 wherein the material is contacted with the carbonaceous matter and the reagent comprising the thiocarbonyl functional group in a method comprising a percolation leach.

20. The method of claim 1 wherein the material is contacted with the carbonaceous matter and the reagent comprising the thiocarbonyl functional group in a method comprising a heap leach.

21. The method of claim 1 wherein the method further comprises recovering the base metal.

22. The method of claim 1 wherein the contacting of the material with the carbonaceous matter and the reagent comprising the thiocarbonyl functional group produces a pregnant leach solution comprising the base metal and the method further comprises recovering the base metal from the pregnant leach solution.

23. The method of claim 22 wherein the recovering comprises solvent extraction and electrowinning.

24. The method of claim 23 wherein prior to the recovering, the method further comprises a solid-liquid separation.

25. The method of claim 1 wherein the method further comprises recovering the reagent comprising the thiocarbonyl functional group.

26. The method of claim 20 wherein the method further comprises recycling the recovered reagent comprising the thiocarbonyl functional group for use in the contacting of a further portion of the material.

27. The method of claim 1 wherein the material is contacted with the carbonaceous matter and the reagent comprising the thiocarbonyl functional group at ambient temperature and pressure.

28. The method of claim 1 wherein the method comprises a batch method.

29. The method of claim 1 wherein the method comprises a continuous method.

* * * * *